(12) United States Patent
Tsai et al.

(10) Patent No.: US 8,797,658 B2
(45) Date of Patent: Aug. 5, 2014

(54) CAPTURING LENS SYSTEM

(75) Inventors: Tsung-Han Tsai, Taichung (TW);
Wei-Yu Chen, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 305 days.

(21) Appl. No.: 13/488,636

(22) Filed: Jun. 5, 2012

(65) Prior Publication Data

US 2013/0188266 A1    Jul. 25, 2013

(30) Foreign Application Priority Data

Jan. 20, 2012    (TW) .............................. 101102345 A

(51) Int. Cl.
*G02B 3/02*    (2006.01)
*G02B 13/18*    (2006.01)
*G02B 13/00*    (2006.01)

(52) U.S. Cl.
CPC ................................. *G02B 13/0035* (2013.01)
USPC ........................... 359/716; 359/785; 359/715

(58) Field of Classification Search
CPC ...... G02B 13/0035; G02B 13/18; G02B 9/12; G02B 13/06; G02B 13/04; G02B 13/22; G02B 9/16; G02B 13/0045; G02B 15/177
USPC ......... 359/716, 700, 715, 682, 651, 661, 735, 359/748, 753, 754, 784, 708, 785
See application file for complete search history.

(56) References Cited

U.S. PATENT DOCUMENTS

| 7,525,741 | B1 | 4/2009 | Noda |
| 7,564,635 | B1 | 7/2009 | Tang |
| 7,894,141 | B2 * | 2/2011 | Do ................................ 359/716 |

* cited by examiner

*Primary Examiner* — William Choi
*Assistant Examiner* — Sharrief Broome
(74) *Attorney, Agent, or Firm* — Morris Manning & Martin LLP; Tim Tingkang Xia, Esq.

(57) ABSTRACT

This invention provides a capturing lens system in order from an object side to an image side comprising: a first lens element with positive refractive power; a plastic second lens element with negative refractive power having a concave object-side surface and a convex image-side surface, both the object-side and image-side surfaces thereof being aspheric; and a plastic third lens element with positive refractive power having a convex object-side surface and a concave image-side surface, both the object-side and image-side surfaces thereof being aspheric, and at least one inflection point is formed on at least one of the object-side and image-side surfaces thereof. Additionally, the central thickness of the second lens element is controlled favorably for the efficient spatial arrangement of the lens assembly and the simpler individual lens production while assuring suitable thickness of the second lens element, thereby assuring high image quality and improving yield rate of the product.

20 Claims, 16 Drawing Sheets

CAPTURING LENS SYSTEM

BACKGROUND

1. Technical Field

The present disclosure relates to a capturing lens system, and more particularly, to a compact capturing lens system used in electronic products or a capturing lens system in three-dimensions imaging.

2. Description of the Prior Art

In recent years, with the popularity of portable electronic products having photographing function, the demand of compact imaging lens system has grown. Generally, the sensor of a general photographing camera is none other than CCD (Charge Coupled Device) or CMOS device (Complementary Metal Oxide Semiconductor device). Furthermore, advances in semiconductor manufacturing technology have allowed the pixel size of sensors to be reduced and therefore lead compact imaging lens systems to higher resolution. In the meantime, the demand for better image quality is also increased.

A conventional compact photographing optical lens assembly, in order to reduce manufacturing costs, is usually composed of a two-lens structure, such as a two-lens imaging lens assembly disclosed by U.S. Pat. No. 7,525,741. However, two-lens structure has limited ability in correcting aberrations, which is unable to satisfy the demand of high level imaging modules. On the other hand, utilizing too many lens elements in the assembly will also be difficult for the total track length of the lens assembly to stay compact.

To obtain high image quality while maintaining the compact feature of the lens assembly, photographing optical lens assembly with three lens elements proves to be the solution. U.S. Pat. No. 7,564,635 discloses a photographing optical lens assembly with three lens elements. However, three lens elements of the lens assembly are all positive refractive lens elements, which make it difficult to correct the aberration (such as chromatic aberration) in the system and the image quality is compensated. Therefore, a need exists in the art for a photographing optical lens assembly that features high image quality without having a long total track length and applicable in portable electronic products.

SUMMARY

By the following disclosed arrangement, the capturing lens system of the invention makes the central thickness of the second lens element more favorable for not only the efficient spatial arrangement of the lens assembly but also the simpler individual lens production while assuring suitable thickness of the second lens element, thereby assuring image quality and improving yield rate of the product.

The present disclosure provides a capturing lens system comprising, in order from an object side to an image side: a first lens element with positive refractive power; a plastic second lens element with negative refractive power having a concave object-side surface and a convex image-side surface, both the object-side and image-side surfaces thereof being aspheric; and a plastic third lens element with positive refractive power having a convex object-side surface and a concave image-side surface, both the object-side and image-side surfaces thereof being aspheric, and at least one inflection point is formed on at least one of the object-side and image-side surfaces thereof; wherein there are three lens elements with refractive power in the capturing lens system, which are the first lens element, the second lens element and the third lens element; and the second lens element has the greatest central thickness among the three lens elements; a central thickness of the first lens element is CT1, a central thickness of the second lens element is CT2, a central thickness of the third lens element is CT3, an axial distance between the first lens element and the second lens element is T12, an axial distance between the second lens element and the third lens element is T23, and they satisfy the following relations: $0.2<CT1/CT2<1.0$; $0.2<CT3/CT2<1.0$; and $0.3<T12/T23<1.8$.

On the other hand, the present disclosure provides a capturing lens system comprising, in order from an object side to an image side: a first lens element with positive refractive power; a plastic second lens element with negative refractive power having a concave object-side surface and a convex image-side surface, both the object-side and image-side surfaces thereof being aspheric; and a plastic third lens element with positive refractive power having a convex object-side surface and a concave image-side surface, both the object-side and image-side surfaces thereof being aspheric, and at least one inflection point is formed on at least one of the object-side and image-side surfaces thereof; wherein there are three lens elements with refractive power in the capturing lens system, which are the first lens element, the second lens element and the third lens element; and the second lens element has the greatest central thickness among the three lens elements; a central thickness of the first lens element is CT1, a central thickness of the second lens element is CT2, a central thickness of the third lens element is CT3, an axial distance between the first lens element and the second lens element is T12, an axial distance between the second lens element and the third lens element is T23, an Abbe number of the second lens element is V2, and they satisfy the following relations: $0.2<CT1/CT2<1.0$; $0.2<CT3/CT2<1.0$; $0.3<T12/T23<1.8$; and $10<V2<27$.

In the aforementioned capturing lens system, the first lens element has positive refractive power providing a part of the refractive power for the system so as to favorably reduce the total track length of the capturing lens system; the second lens element has negative refractive power so that the aberration generated by the first lens element and the chromatic aberration of the optical system can be favorably corrected; the third lens element has positive refractive power, which effectively distributes the refractive power of the capturing lens system along in relation with the first lens element in order to reduces the sensitivity of the system.

In the aforementioned capturing lens system, when the first lens element has a convex object-side surface, the positive refractive power of the lens elements can be strengthened and thereby the total track length of the lens assembly can be reduced even more. When the second lens element is a meniscus lens element with a concave object-side surface and a convex image-side surface, the astigmatism of the system can be corrected favorably. When the third lens element is a meniscus lens element with a convex object-side surface and a concave image-side surface, it facilitates the correction of the astigmatism and high order aberrations of the system. In addition, when at least one inflection is formed on the third lens element, the angle at which light projects onto the image sensor from the off-axis field can be effectively reduced so that the sensing efficiency of the image sensor can be improved and the off-axis aberration can be corrected.

DETAILED DESCRIPTION OF THE PREFERRED EMBODIMENTS

Figure 1A:
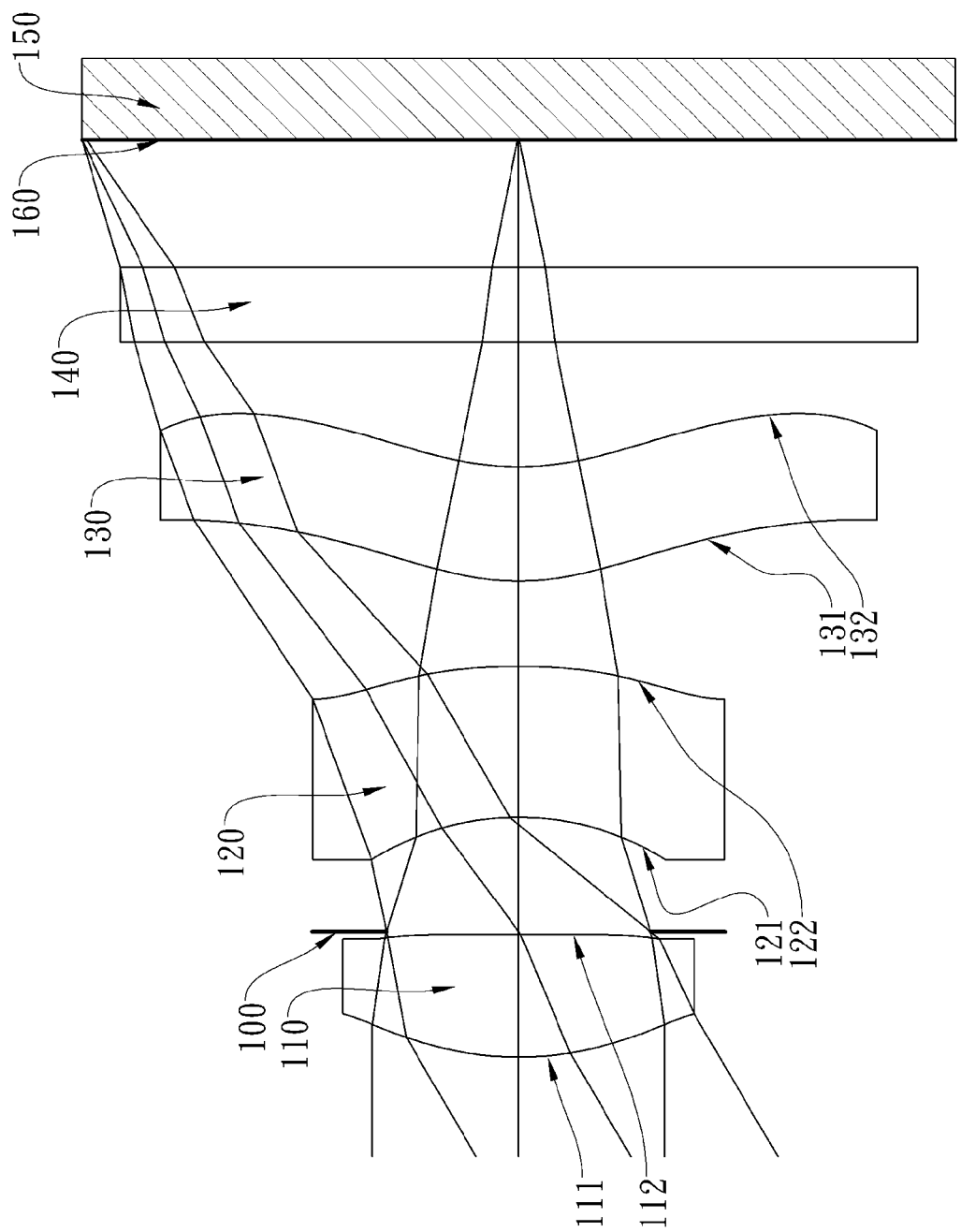
FIG. 1A shows a capturing lens system in accordance with a first embodiment of the present disclosure.

The present disclosure provides a capturing lens system comprising, in order from an object side to an image side: a first lens element with positive refractive power; a plastic second lens element with negative refractive power having a concave object-side surface and a convex image-side surface, both the object-side and image-side surfaces thereof being aspheric; and a plastic third lens element with positive refractive power having a convex object-side surface and a concave image-side surface, both the object-side and image-side surfaces thereof being aspheric, and at least one inflection point is formed on at least one of the object-side and image-side surfaces thereof; wherein there are three lens elements with refractive power in the capturing lens system, which are the first lens element, the second lens element and the third lens element; and the second lens element has the greatest central thickness among the three lens elements; a central thickness of the first lens element is CT1, a central thickness of the second lens element is CT2, a central thickness of the third lens element is CT3, an axial distance between the first lens element and the second lens element is T12, an axial distance between the second lens element and the third lens element is T23, and they satisfy the following relations: $0.2 < CT1/CT2 < 1.0$; $0.2 < CT3/CT2 < 1.0$; and $0.3 < T12/T23 < 1.8$.

When the relation of $0.2 < CT1/CT2 < 1.0$ is satisfied, the central thickness ratio of the first lens element and the second lens element is more appropriate for facilitating the assembly of the lens elements, the space allocation within the capturing lens system, and the simpler individual lens production, thereby assuring higher image quality and improving yield rate of the product.

When the relation of $0.2 < CT3/CT2 < 1.0$ is satisfied, the central thickness ratio of the second lens element and the third lens element is more appropriate for facilitating the assembly of the lens elements, the space allocation within the capturing lens system, and the simpler individual lens production, thereby assuring image quality and improving yield rate of the product; preferably, the following relation is satisfied: $0.4 < CT3/CT2 < 0.93$.

When the relation of $0.3 < T12/T23 < 1.8$ is satisfied, the space between lens elements of the lens system is proper, which is not only favorable for more efficiency in space arrangement of lens elements, for keeping the lens system compact; preferably, the following relation is satisfied: $0.5 < T12/T23 < 1.5$.

When the greatest central thickness is the second lens element among the three lens elements of the capturing lens system, the thickness of the lens elements of the lens system can be then arranged more appropriately and provided the simpler individual lens production while assuring suitable thickness of the second lens element, and thereby not only improving the moldability and homogeneity of the plastic-injection-molded lenses, but also achieving good image quality of the capturing lens system.

In the aforementioned capturing lens system, the first lens element has a convex object-side surface, a radius of the curvature of the object-side surface of the second lens element is R3, a radius of the curvature of the image-side surface of the second lens element is R4, and they preferably satisfy the following relation: $0 < R3/R4 < 0.9$. When the above relation is satisfied, sufficient negative refractive power is provided and thereby the field curvature and the coma of the system can be effectively corrected.

In the aforementioned capturing lens system, a focal length of the first lens element is f1, a focal length of the third lens element is f3, and they preferably satisfy the following relation: $0 < f1/f3 < 0.5$. When the above relation is satisfied, the refractive power of the system is mainly provided by the first lens element and thereby the total track length of the system can be effectively reduced.

In the aforementioned capturing lens system, an Abbe number of the second lens element is V2, and it preferably satisfies the following relation: $10 < V2 < 27$. When the above relation is satisfied, the chromatic aberration of the capturing lens system can be favorably corrected.

In the aforementioned capturing lens system, a focal length of the capturing lens system is f, the focal length of the first lens element is f1, and they preferably satisfy the following relation: $1.25 < f/f1 < 1.50$. When the above relation is satisfied, the refractive power of the first lens element is more balanced so that the total track length of the system can be effectively reduced for keeping the lens system compact. The above relation also prevents the high order spherical aberration from becoming too large, so that the image quality can be improved.

In the aforementioned capturing lens system, the radius of the curvature of the image-side surface of the third lens element is R6, the focal length of the capturing lens system is f, and they preferably satisfy the following relation: $0 < R6/f < 0.80$. When the above relation is satisfied, suitable refractive power can be obtained by the configuration of the curvature radius of the image-side surface of the third lens element, and thereby the aberration of the system can be favorably corrected as well as the manufacturing sensitivity of thereof can be reduced; preferably, the following relation is satisfied: $0 < R6/f < 0.38$.

In the aforementioned capturing lens system, the central thickness of the first lens element is CT1, the central thickness of the second lens element is CT2, the central thickness of the third lens element is CT3, and they preferably satisfy the following relation: $0.60 \text{ mm} < CT1+CT2+CT3 < 1.56 \text{ mm}$. When the above relation is satisfied, the central thickness sum of the first lens element, the second lens element and the third lens element is more appropriate, thereby facilitating the assembly of the lens elements and the space allocation within the capturing lens system.

In the aforementioned capturing lens system, a focal length of the capturing lens system is f, an entrance pupil diameter of the capturing lens system is EPD, and they preferably satisfy the following relation: 1.95<f/EPD<2.75. When the above relation is satisfied, the amount of light entering the capturing lens system is more sufficient, thereby the response speed of the sensor can be increased.

In the aforementioned capturing lens system, an axial distance between the object-side surface of the first lens element and the image plane is TTL, a maximum image height of the capturing lens system is ImgH, and they preferably satisfy the following relation: TTL/ImgH<2.15. The above relation enables the capturing lens system to maintain a compact form so that it can be equipped in compact portable electronic products.

On the other hand, the present disclosure provides a capturing lens system comprising, in order from an object side to an image side: a first lens element with positive refractive power; a plastic second lens element with negative refractive power having a concave object-side surface and a convex image-side surface, both the object-side and image-side surfaces thereof being aspheric; and a plastic third lens element with positive refractive power having a convex object-side surface and a concave image-side surface, both the object-side and image-side surfaces thereof being aspheric, and at least one inflection point is formed on at least one of the object-side and image-side surfaces thereof; wherein there are three lens elements with refractive power in the capturing lens system, which are the first lens element, the second lens element and the third lens element; and the second lens element has the greatest central thickness among the three lens elements; a central thickness of the first lens element is CT1, a central thickness of the second lens element is CT2, a central thickness of the third lens element is CT3, an axial distance between the first lens element and the second lens element is T12, an axial distance between the second lens element and the third lens element is T23, an Abbe number of the second lens element is V2, and they satisfy the following relations: 0.2<CT1/CT2<1.0; 0.2<CT3/CT2<1.0; 0.2<T12/T23<1.8; and 10<V2<27.

When the relation of 0.2<CT1/CT2<1.0 is satisfied, the central thickness ratio of the first lens element and the second lens element is more appropriate for facilitating the assembly of the lens elements, the space allocation within the capturing lens system, as well as the simpler individual lens production, thereby assuring better image quality and improving yield rate of the product.

When the relation of 0.2<CT3/CT2<1.0 is satisfied, the central thickness ratio of the second lens element and the third lens element is more appropriate for facilitating the assembly of the lens elements, the space allocation within the capturing lens system, as well as the simpler individual lens production, thereby assuring image quality and improving yield rate of the product; preferably, the following relation is satisfied: 0.4<CT3/CT2<0.93.

When the relation of 0.2<T12/T23<1.8 is satisfied, the space between lens elements of the lens system is proper, which is not only favorable for more efficiency in space arrangement of lens elements, for keeping the lens system compact; preferably, the following relation is satisfied: 0.5<T12/T23<1.5.

When the relation of 10<V2<27 is satisfied, the chromatic aberration of the capturing lens system can be favorably corrected.

When there are three lens elements with refractive power in the capturing lens system, a good balance between preventing the total track length of the assembly from being too long and keeping good image quality can be achieved.

When the greatest central thickness is the second lens element among the three lens elements of the capturing lens system, the thickness of the lens elements of the lens system can be arranged more appropriately and the simpler individual lens production while assuring suitable thickness of the second lens element, and thereby not only improving the moldability and homogeneity of the plastic-injection-molded lenses, but also achieving good image quality of the capturing lens system.

In the aforementioned capturing lens system, the first lens element has a convex object-side surface, a radius of the curvature of the object-side surface of the second lens element is R3, a radius of the curvature of the image-side surface of the second lens element is R4, and they preferably satisfy the following relation: 0<R3/R4<0.9. When the above relation is satisfied, sufficient negative refractive power is provided and thereby the field curvature and the coma of the system can be effectively corrected.

In the aforementioned capturing lens system, the radius of the curvature of the image-side surface of the third lens element is R6, the focal length of the capturing lens system is f, and they preferably satisfy the following relation: 0<R6/f<0.80. When the above relation is satisfied, suitable refractive power can be obtained by the configuration of the curvature radius of the image-side surface of the third lens element, and thereby the aberration of the system can be favorably corrected as well as the manufacturing sensitivity of thereof can be reduced.

In the aforementioned capturing lens system, a focal length of the first lens element is f1, a focal length of the third lens element is f3, and they preferably satisfy the following relation: 0<f1/f3<0.5. When the above relation is satisfied, the refractive power of the system is mainly provided by the first lens element and thereby the total track length of the system can be effectively reduced.

In the aforementioned capturing lens system, a focal length of the capturing lens system is f, the focal length of the first lens element is f1, and they preferably satisfy the following relation: 1.25<f/f1<1.50. When the above relation is satisfied, the refractive power of the first lens element is more balanced so that the total track length of the system can be effectively reduced for keeping the lens system compact. The above relation also prevents the high order spherical aberration from becoming too large, so that the image quality can be improved.

In the aforementioned capturing lens system, the central thickness of the first lens element is CT1, the central thickness of the second lens element is CT2, the central thickness of the third lens element is CT3, and they preferably satisfy the following relation: 0.60 mm<CT1+CT2+CT3<1.56 mm. When the above relation is satisfied, the central thickness sum of the first lens element, the second lens element and the third lens element is more appropriate, thereby facilitating the assembly of the lens elements and the space allocation within the capturing lens system.

In the aforementioned capturing lens system, the lens elements can be made of glass or plastic material. If the lens elements are made of glass, the freedom for distributing the refractive power of the capturing lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the required number of the lens elements used in an optical system. Consequently, the total track length of the capturing lens system can be effectively reduced.

In the present capturing lens system, if a lens element has a convex surface, it means the portion of the surface in proximity to the optical axis is convex; if a lens element has a concave surface, it means the portion of the surface in proximity to the optical axis is concave.

In the present capturing lens system, there can be at least one stop, such as a glare stop or a field stop, provided for eliminating stray light and thereby improving image resolution thereof. In addition, in the present capturing lens system, a stop can be configured as a front stop (in front of the first lens element), a middle stop (between the first lens element and an image plane) or in front of the image plane. The allocation of the stop is determined by the preference of the optical designer.

Preferred embodiments of the present disclosure will be described in the following paragraphs by referring to the accompanying drawings.

Embodiment 1

Figure 1B:
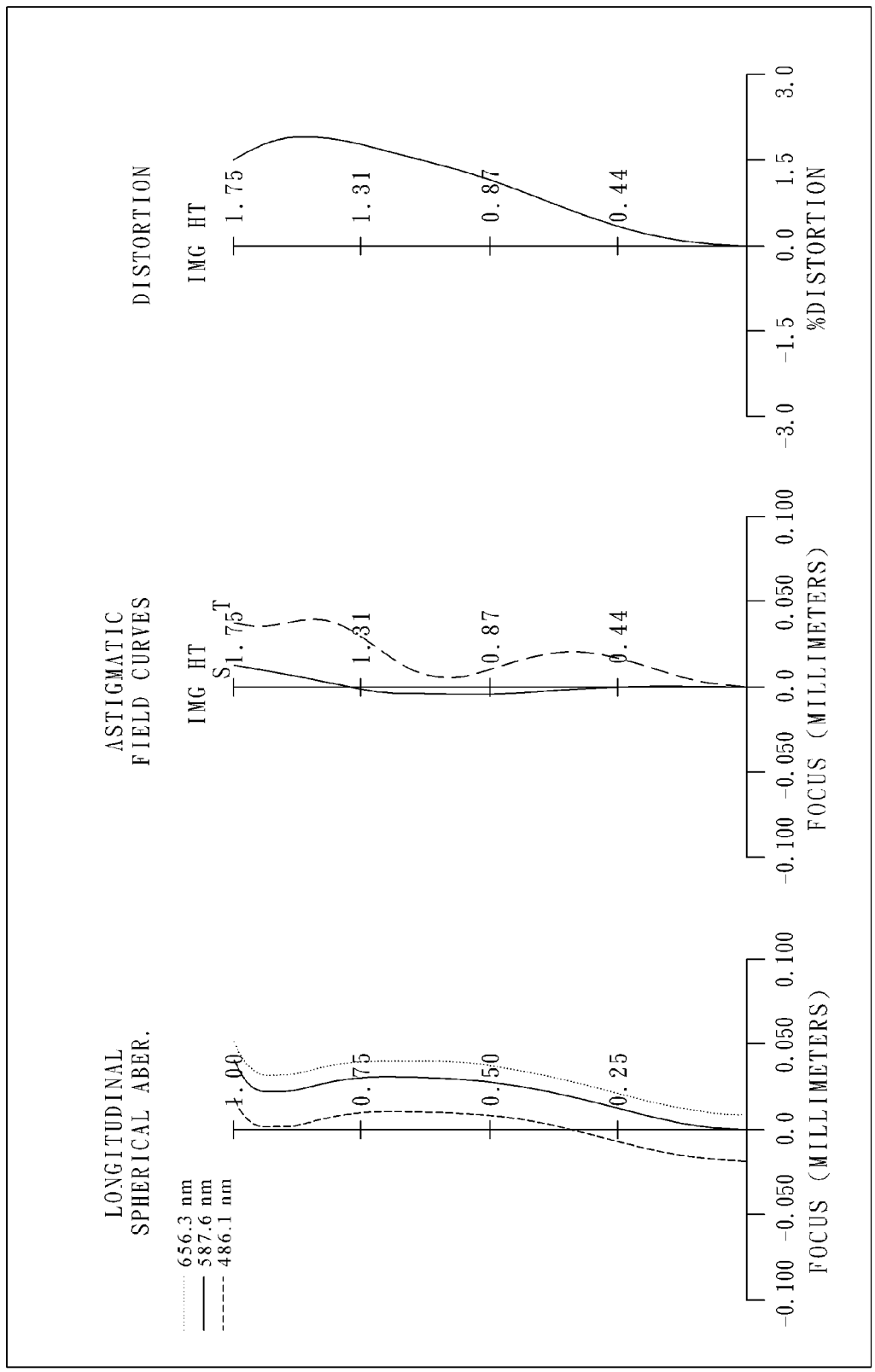
FIG. 1B shows the aberration curves of the first embodiment of the present disclosure.

FIG. 1A shows a capturing lens system in accordance with the first embodiment of the present disclosure, and FIG. 1B shows the aberration curves of the first embodiment of the present disclosure. The capturing lens system of the first embodiment of the present disclosure comprises three lens elements, in order from an object side to an image side:

a first lens element 110 made of plastic with positive refractive power having a convex object-side surface 111 and a concave image-side surface 112, the object-side and image-side surfaces 111 and 112 thereof being spherical;

a second lens element 120 made of plastic with negative refractive power having a concave object-side surface 121 and a convex image-side surface 122, the object-side and image-side surfaces 121 and 122 thereof being aspheric; and a third lens element 130 made of plastic with positive refractive power having a convex object-side surface 131 and a concave image-side surface 132, the object-side and image-side surfaces 131 and 132 thereof being aspheric, and at least one inflection point is formed on both the object-side surface 131 and the image-side surface 132 thereof;

wherein there are three lens elements with refractive power in the capturing lens system, which are the first lens element 110, the second lens element 120 and the third lens element 130 respectively; and the second lens element 120 has the greatest central thickness among the three lens elements 110, 120 and 130;

wherein an aperture stop 100 is disposed between the first lens element 110 and the second lens element 120;

the capturing lens system further comprises an IR filter 140 disposed between the image-side surface 132 of the third lens element 130 and an image plane 160, and the IR filter 140 is made of glass and has no influence on the focal length of the capturing lens system; the capturing lens system further comprises an image sensor 150 provided on the image plane 160.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 2.93 mm, Fno = 2.50, HFOV = 30.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.286 | ASP | 0.493 | Plastic | 1.544 | 55.9 | 2.39 |
| 2 | | 100.000 | ASP | 0.011 | | | | |
| 3 | Ape. Stop | Plano | | 0.458 | | | | |
| 4 | Lens 2 | −1.147 | ASP | 0.606 | Plastic | 1.607 | 26.6 | −4.31 |
| 5 | | −2.449 | ASP | 0.342 | | | | |
| 6 | Lens 3 | 0.963 | ASP | 0.459 | Plastic | 1.544 | 55.9 | 6.79 |
| 7 | | 1.083 | ASP | 0.5 | | | | |
| 8 | IR-filter | Plano | | 0.3 | Glass | 1.517 | 64.2 | — |
| 9 | | Plano | | 0.512 | | | | |
| 10 | Image | Plano | | — | | | | |

* Reference wavelength is d-line 587.6 nm

TABLE 2

Aspheric Coefficients

| | Surface # | | | | | |
|---|---|---|---|---|---|---|
| | 1 | 2 | 4 | 5 | 6 | 7 |
| k = | 1.5944E−01 | 0.0000E+00 | 3.5249E−01 | 1.9623E+00 | −4.0891E+00 | −2.2901E+00 |
| A4 = | −5.2788E−02 | −1.0051E−01 | −1.2622E−01 | −3.7487E−01 | −2.3101E−01 | −2.9070E−01 |
| A6 = | 8.4006E−03 | −4.1312E−01 | 5.7672E−01 | 1.0474E+00 | 1.6527E−01 | 1.8767E−01 |
| A8 = | −4.5196E−01 | 1.6060E+00 | −1.1376E+00 | −9.7938E−01 | −6.4175E−02 | −8.2304E−02 |
| A10 = | 5.6291E−01 | −6.6678E+00 | 4.0690E+00 | 4.2627E−01 | 9.4870E−03 | 1.7383E−02 |
| A12 = | −1.1091E+00 | 8.7427E+00 | −1.3669E+01 | 3.6530E−01 | 1.2034E−03 | −7.0247E−04 |
| A14 = | | | 1.5263E+01 | −3.4007E−01 | −4.6992E−04 | −2.9820E−04 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:
X: the distance of a point on the aspheric surface at a distance Y from the optical axis relative to the tangential plane at the aspheric surface vertex;
Y: the distance from the point on the curve of the aspheric surface to the optical axis;
R: curvature radius;
k: the conic coefficient;
Ai: the aspheric coefficient of order i.

In the first embodiment of the present capturing lens system, the focal length of the capturing lens system is f, and it satisfies the following relation: f=2.93 (mm).

In the first embodiment of the present capturing lens system, the f-number of the capturing lens system is Fno, and it satisfies the relation: Fno=2.50.

In the first embodiment of the present capturing lens system, half of the maximal field of view of the capturing lens system is HFOV, and it satisfies the relation: HFOV=30.3 deg.

In the first embodiment of the present capturing lens system, an Abbe number of the second lens element 120 is V2, and it satisfies the relation: V2=26.6.

In the first embodiment of the present capturing lens system, a central thickness of the first lens element 110 is CT1, a central thickness of the second lens element 120 is CT2, and it satisfies the relation: CT1/CT2=0.81.

In the first embodiment of the present capturing lens system, a central thickness of the third lens element 130 is CT3, the central thickness of the second lens element 120 is CT2, and it satisfies the relation: CT3/CT2=0.76.

In the first embodiment of the present capturing lens system, the central thickness of the first lens element 110 is CT1, the central thickness of the second lens element 120 is CT2, the central thickness of the third lens element 130 is CT3, and it satisfies the relation: CT1+CT2+CT3=1.56 (mm).

In the first embodiment of the present capturing lens system, an axial distance between the first lens element 110 and the second lens element 120 is T12, an axial distance between the second lens element 120 and the third lens element 130 is T23, and it satisfies the relation: T12/T23=1.37.

In the first embodiment of the present capturing lens system, a radius of the curvature of the object-side surface 121 of the second lens element 120 is R3, a radius of the curvature of the image-side surface 122 of the second lens element 120 is R4, and it satisfies the relation: R3/R4=0.47.

In the first embodiment of the present capturing lens system, a radius of the curvature of the image-side surface 132 of the third lens element 130 is R6, the focal length of the capturing lens system is f, and it satisfies the relation: R6/f=0.37.

In the first embodiment of the present capturing lens system, the focal length of the capturing lens system is f, a focal length of the first lens element 110 is f1, and it satisfies the relation: f/f1=1.23.

In the first embodiment of the present capturing lens system, the focal length of the first lens element 110 is f1, a focal length of the third lens element 130 is f3, and it satisfies the relation: f1/f3=0.35.

In the first embodiment of the present capturing lens system, the focal length of the capturing lens system is f, an entrance pupil diameter of the capturing lens system is EPD, and it satisfies the relation: f/EPD=2.93.

In the first embodiment of the present capturing lens system, an axial distance between the object-side surface 111 of the first lens element 110 and the image plane 160 is TTL, a maximum image height of the capturing lens system, which here is a half of a diagonal length of an effective photosensitive area of the image sensor 150, is ImgH, and it satisfies the relation: TTL/ImgH=2.05.

Embodiment 2

Figure 2A:
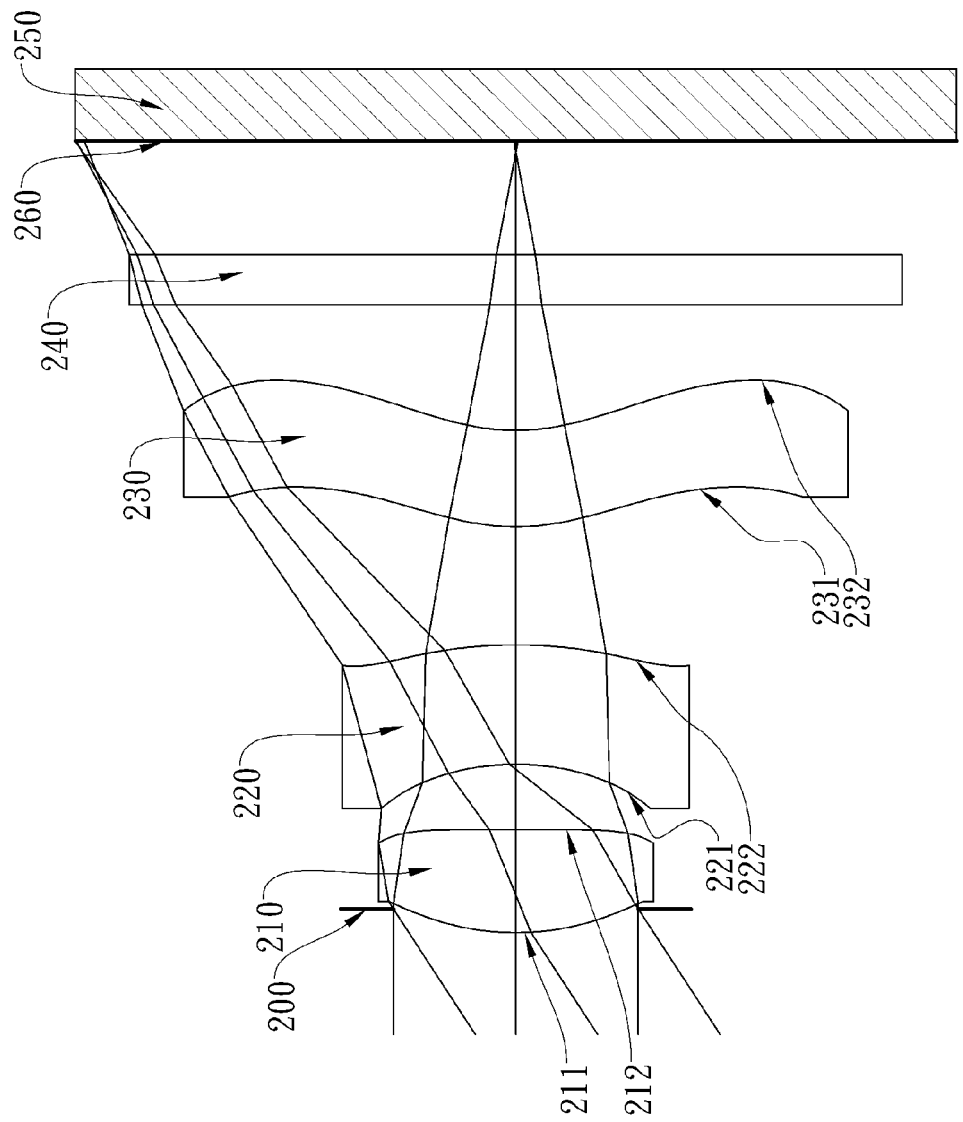
FIG. 2A shows a capturing lens system in accordance with a second embodiment of the present disclosure.
Figure 2B:
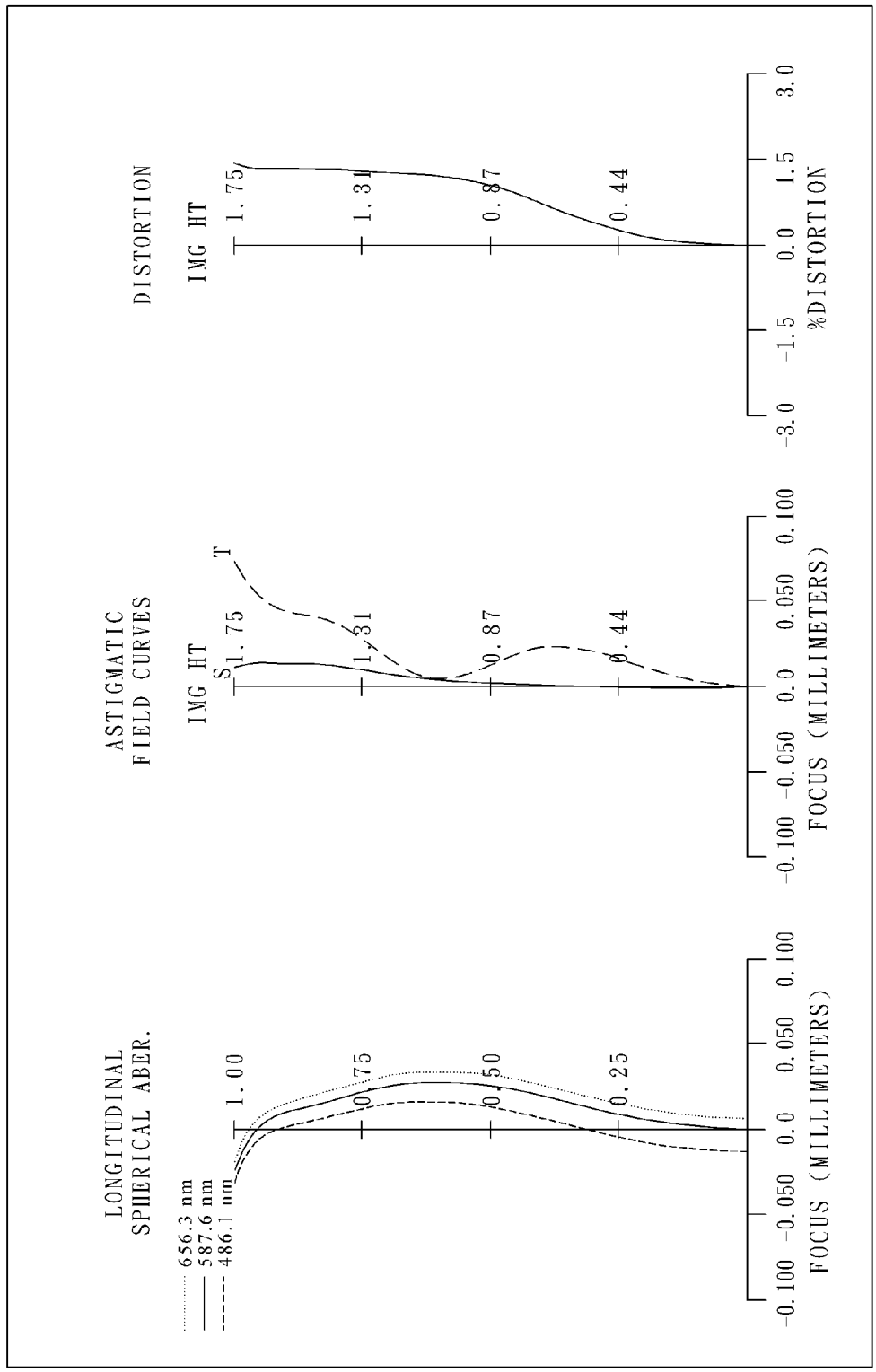
FIG. 2B shows the aberration curves of the second embodiment of the present disclosure.

FIG. 2A shows a capturing lens system in accordance with the second embodiment of the present disclosure, and FIG. 2B shows the aberration curves of the second embodiment of the present disclosure. The capturing lens system of the second embodiment of the present disclosure comprises three lens elements, in order from an object side to an image side:

a first lens element 210 made of plastic with positive refractive power having a convex object-side surface 211 and a concave image-side surface 212, the object-side and image-side surfaces 211 and 212 thereof being aspheric;

a second lens element 220 made of plastic with negative refractive power having a concave object-side surface 221 and a convex image-side surface 222, the object-side and image-side surfaces 221 and 222 thereof being aspheric; and a third lens element 230 made of plastic with positive refractive power having a convex object-side surface 231 and a concave image-side surface 232, the object-side and image-side surfaces 231 and 232 thereof being aspheric, and at least one inflection point is formed on both the object-side surface 231 and the image-side surface 232 thereof;

wherein there are three lens elements with refractive power in the capturing lens system, which are the first lens element 210, the second lens element 220 and the third lens element 230 respectively; and the second lens element 220 has the greatest central thickness among the three lens elements 210, 220 and 230;

wherein an aperture stop 200 is disposed between an imaged object and the first lens element 210;

the capturing lens system further comprises an IR filter 240 disposed between the image-side surface 232 of the third lens element 230 and an image plane 260, and the IR filter 240 is made of glass and has no influence on the focal length of the capturing lens system; the capturing lens system further comprises an image sensor 250 provided on the image plane 260.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 2.63 mm, Fno = 2.70, HFOV = 33.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.094 | | | | |
| 2 | Lens 1 | 1.026 | ASP | 0.410 | Plastic | 1.544 | 55.9 | 1.96 |
| 3 | | 22.222 | ASP | 0.261 | | | | |
| 4 | Lens 2 | −1.059 | ASP | 0.476 | Plastic | 1.634 | 23.8 | −4.39 |
| 5 | | −2.005 | ASP | 0.471 | | | | |
| 6 | Lens 3 | 0.883 | ASP | 0.384 | Plastic | 1.530 | 55.8 | 15.63 |
| 7 | | 0.840 | ASP | 0.500 | | | | |
| 8 | IR-filter | Plano | | 0.200 | Glass | 1.517 | 64.2 | |
| 9 | | Plano | | 0.453 | | | | |
| 10 | Image | Plano | | — | — | | | |

* Reference wavelength is d-line 587.6 nm

TABLE 4

Aspheric Coefficients

| | Surface # | | | | | |
|---|---|---|---|---|---|---|
| | 2 | 3 | 4 | 5 | 6 | 7 |
| k = | −1.3953E+00 | −1.0000E+00 | 4.7450E−02 | 3.7401E+00 | −3.0589E+00 | −2.9754E+00 |
| A4 = | 1.2366E−01 | −2.7180E−01 | −3.8049E−01 | −2.2431E−01 | −4.2930E−01 | −3.3797E−01 |
| A6 = | −1.2861E−01 | −6.7510E−01 | 9.8171E−01 | 1.1440E+00 | 2.7631E−01 | 2.0726E−01 |
| A8 = | −6.9311E−02 | −5.8245E−01 | −1.2047E+00 | −9.3353E−02 | −8.6468E−02 | −8.9116E−02 |
| A10 = | 2.4676E−01 | −5.2149E+00 | −1.1811E+00 | −1.1598E+00 | −9.2893E−03 | 1.4944E−02 |
| A12 = | −1.4445E+01 | −5.3550E−01 | 4.0529E+00 | 2.2264E+00 | 9.9517E−03 | 1.4141E−04 |
| A14 = | | | 4.5102E+01 | −6.5253E−01 | −3.1275E−04 | −3.8743E−04 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

(Embodiment 2)

| | |
|---|---|
| f [mm] | 2.63 |
| Fno | 2.70 |
| HFOV[deg.] | 33.1 |
| V2 | 23.8 |
| CT1/CT2 | 0.86 |
| CT3/CT2 | 0.81 |
| CT1 + CT2 + CT3 [mm] | 1.27 |
| T12/T23 | 0.55 |
| R3/R4 | 0.53 |
| R6/f | 0.32 |
| f/f1 | 1.34 |
| f1/f3 | 0.13 |
| f/EPD | 2.63 |
| TTL/ImgH | 1.76 |

Embodiment 3

Figure 3A:
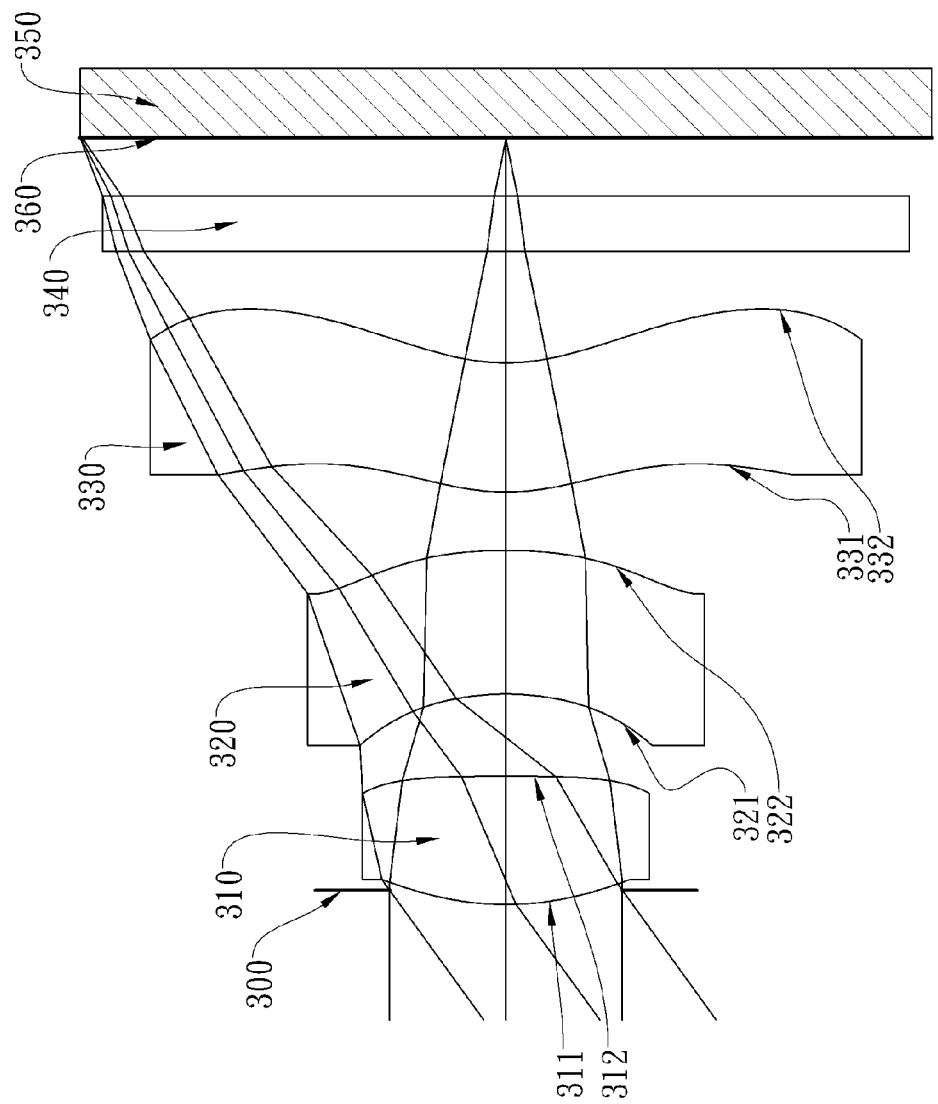
FIG. 3A shows a capturing lens system in accordance with a third embodiment of the present disclosure.
Figure 3B:
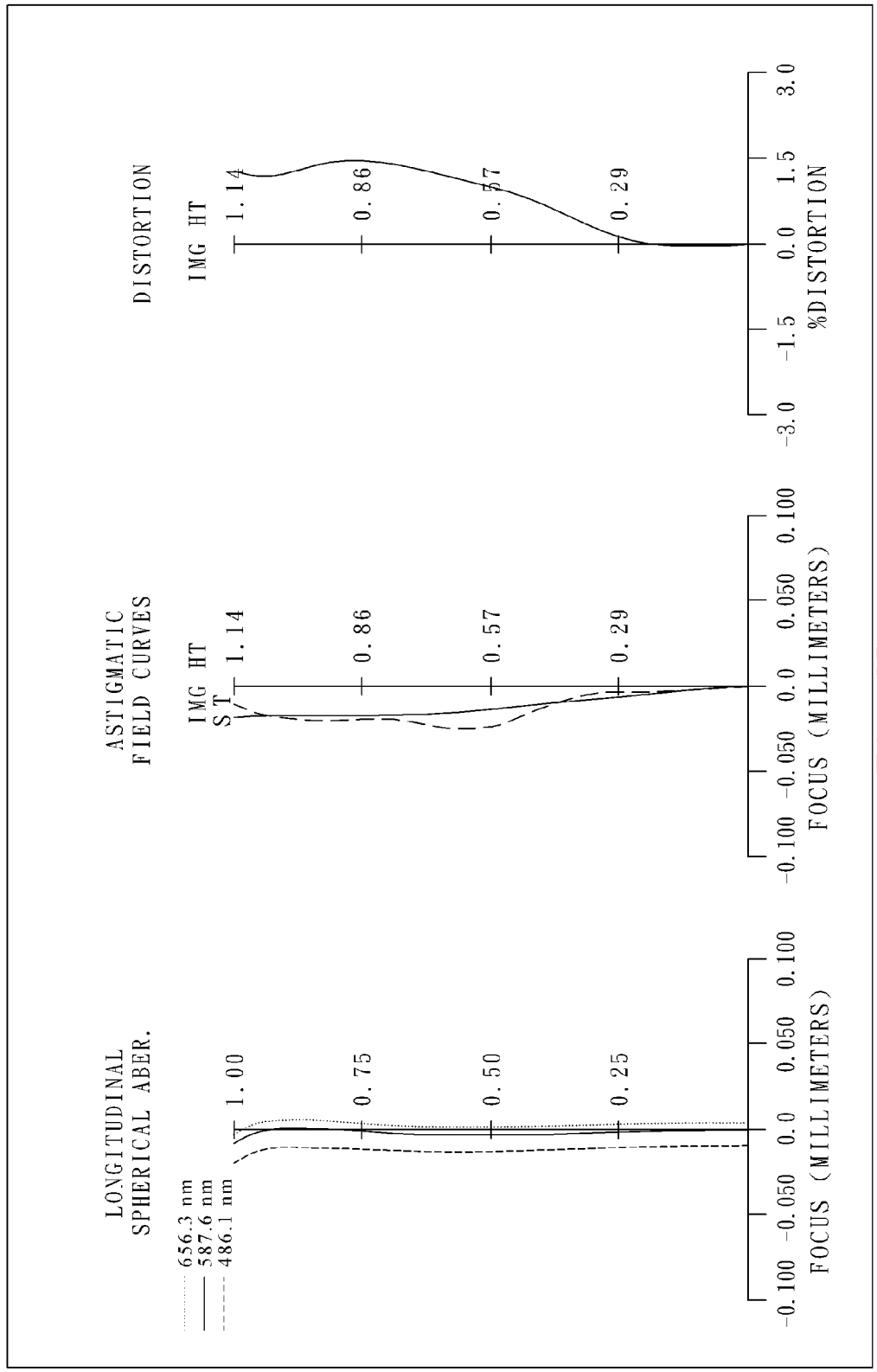
FIG. 3B shows the aberration curves of the third embodiment of the present disclosure.

FIG. 3A shows a capturing lens system in accordance with the third embodiment of the present disclosure, and FIG. 3B shows the aberration curves of the third embodiment of the present disclosure. The capturing lens system of the third embodiment of the present disclosure comprises three lens elements, in order from an object side to an image side:

a first lens element 310 made of plastic with positive refractive power having a convex object-side surface 311 and a convex image-side surface 312, the object-side and image-side surfaces 311 and 312 thereof being aspheric;

a second lens element 320 made of plastic with negative refractive power having a concave object-side surface 321 and a convex image-side surface 322, the object-side and image-side surfaces 321 and 322 thereof being aspheric; and a third lens element 330 made of plastic with positive refractive power having a convex object-side surface 331 and a concave image-side surface 332, the object-side and image-side surfaces 331 and 332 thereof being aspheric, and at least one inflection point is formed on both the object-side surface 331 and the image-side surface 332 thereof;

wherein there are three lens elements with refractive power in the capturing lens system, which are the first lens element 310, the second lens element 320 and the third lens element 330 respectively; and the second lens element 320 has the greatest central thickness among the three lens elements 310, 320 and 330;

wherein an aperture stop 300 is disposed between an imaged object and the first lens element 310;

the capturing lens system further comprises an IR filter 340 disposed between the image-side surface 332 of the third lens element 330 and an image plane 360, and the IR filter 340 is made of glass and has no influence on the focal length of the capturing lens system; the capturing lens system further comprises an image sensor 350 provided on the image plane 360.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 1.57 mm, Fno = 2.50, HFOV = 35.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.038 | | | | |
| 2 | Lens 1 | 0.799 | ASP | 0.346 | Plastic | 1.544 | 55.9 | 1.37 |
| 3 | | −9.762 | ASP | 0.222 | | | | |
| 4 | Lens 2 | −0.756 | ASP | 0.388 | Plastic | 1.640 | 23.3 | −3.67 |
| 5 | | −1.338 | ASP | 0.158 | | | | |
| 6 | Lens 3 | 0.606 | ASP | 0.349 | Plastic | 1.544 | 55.9 | 7.26 |
| 7 | | 0.570 | ASP | 0.300 | | | | |
| 8 | IR-filter | Plano | | 0.150 | Glass | 1.517 | 64.2 | — |
| 9 | | Plano | | 0.157 | | | | |
| 10 | Image | Plano | | — | | | | |

* Reference wavelength is d-line 587.6 nm

TABLE 7

Aspheric Coefficients

| | Surface # | | | | | |
|---|---|---|---|---|---|---|
| | 2 | 3 | 4 | 5 | 6 | 7 |
| k = | −1.4250E+00 | −1.0000E+00 | −7.5782E−01 | 1.7359E+00 | −3.0988E+00 | −2.4580E+00 |
| A4 = | 4.1692E−02 | −9.1365E−01 | −4.9133E−01 | −1.9236E+00 | −2.3795E+00 | −1.4298E+00 |
| A6 = | 4.0364E−01 | −3.6568E+00 | −2.2217E+01 | 1.0152E+01 | 5.6827E+00 | 2.7731E+00 |
| A8 = | −1.3354E+01 | 6.8090E+00 | 2.6819E+02 | −2.7468E+01 | −8.1379E+00 | −3.4201E+00 |
| A10 = | −4.5796E+01 | −2.5474E+02 | −1.7193E+03 | 8.2052E+01 | 6.6061E+00 | 1.7988E+00 |
| A12 = | 1.4674E+02 | 9.0107E+02 | 4.3200E+03 | −1.0940E+02 | −2.1887E+00 | 4.6538E−01 |
| A14 = | | | | 7.3301E+01 | | −1.0807E+00 |
| A16 = | | | | | | 3.9808E−01 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

(Embodiment 3)

| | |
|---|---|
| f [mm] | 1.57 |
| Fno | 2.50 |
| HFOV[deg.] | 35.9 |
| V2 | 23.3 |
| CT1/CT2 | 0.89 |
| CT3/CT2 | 0.90 |
| CT1 + CT2 + CT3 [mm] | 1.08 |
| T12/T23 | 1.41 |
| R3/R4 | 0.57 |
| R6/f | 0.36 |
| f/f1 | 1.14 |
| f1/f3 | 0.19 |
| f/EPD | 1.57 |
| TTL/ImgH | 1.76 |

Embodiment 4

Figure 4A:
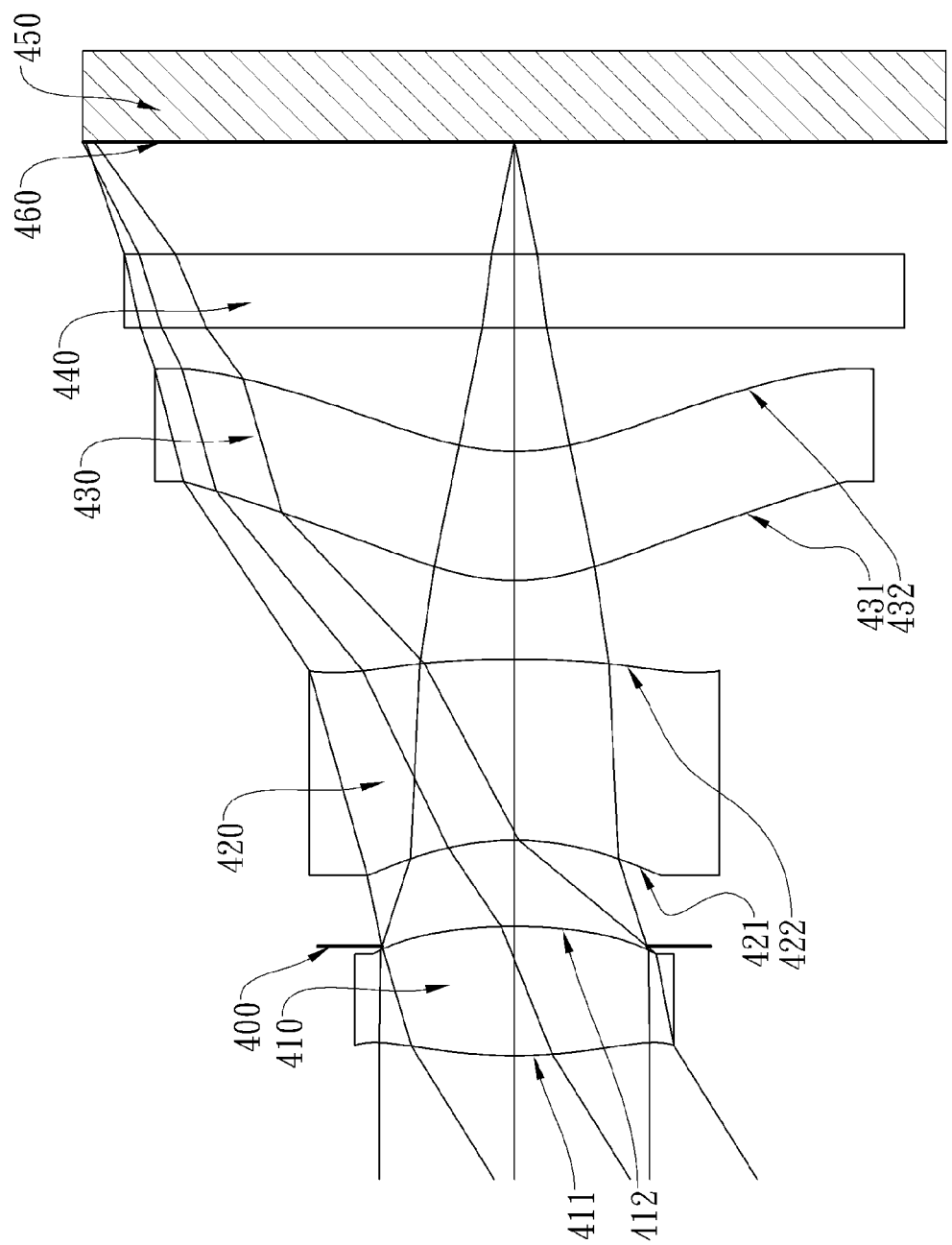
FIG. 4A shows a capturing lens system in accordance with a fourth embodiment of the present disclosure.
Figure 4B:
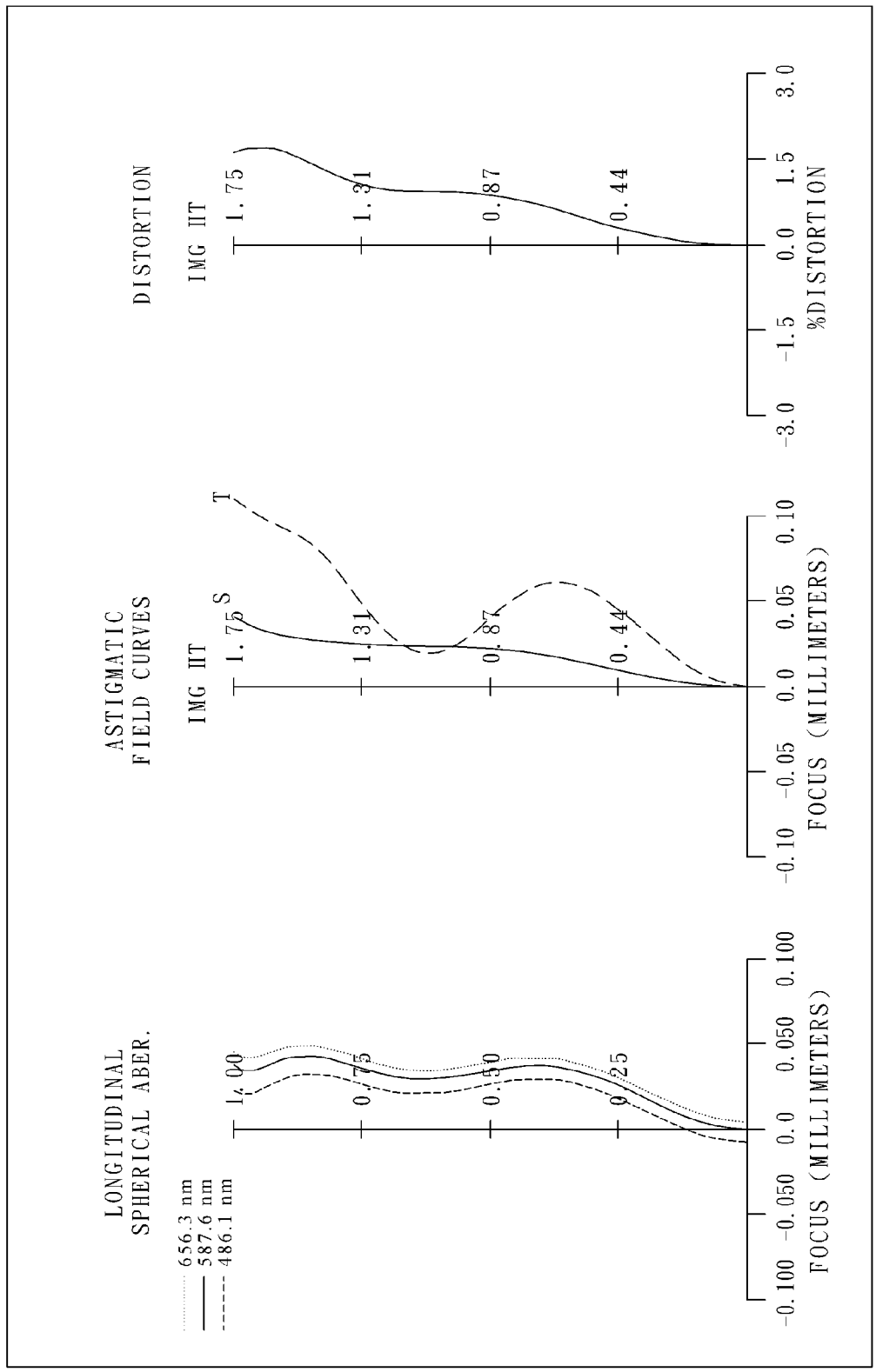
FIG. 4B shows the aberration curves of the fourth embodiment of the present disclosure.

FIG. 4A shows a capturing lens system in accordance with the fourth embodiment of the present disclosure, and FIG. 4B shows the aberration curves of the fourth embodiment of the present disclosure. The capturing lens system of the fourth embodiment of the present disclosure comprises three lens elements, in order from an object side to an image side:

a first lens element 410 made of plastic with positive refractive power having a convex object-side surface 411 and a convex image-side surface 412, the object-side and image-side surfaces 411 and 412 thereof being aspheric;

a second lens element 420 made of plastic with negative refractive power having a concave object-side surface 421 and a convex image-side surface 422, the object-side and image-side surfaces 421 and 422 thereof being aspheric; and a third lens element 430 made of plastic with positive refractive power having a convex object-side surface 431 and a concave image-side surface 432, the object-side and image-side surfaces 431 and 432 thereof being aspheric, and at least one inflection point is formed on both the object-side surface 431 and the image-side surface 432 thereof;

wherein there are three lens elements with refractive power in the capturing lens system, which are the first lens element 410, the second lens element 420 and the third lens element 430 respectively; and the second lens element 420 has the greatest central thickness among the three lens elements 410, 420 and 430;

wherein an aperture stop 400 is disposed between the first lens element 410 and the second lens element 420;

the capturing lens system further comprises an IR filter 440 disposed between the image-side surface 432 of the third lens element 430 and an image plane 460, and the IR filter 440 is made of glass and has no influence on the focal length of the capturing lens system; the capturing lens system further comprises an image sensor 450 provided on the image plane 460.

The detailed optical data of the fourth embodiment is shown in TABLE 9, and the aspheric surface data is shown in TABLE 10, wherein the units of the radius of curvature, the thickness and the focal length are expressed in mm, and HFOV is half of the maximal field of view.

TABLE 9

(Embodiment 4)
f = 2.74 mm, Fno = 2.50, HFOV = 31.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.963 | ASP | 0.524 | Plastic | 1.544 | 55.9 | 1.99 |
| 2 | | −2.181 | ASP | −0.080 | | | | |
| 3 | Ape. Stop | Plano | | 0.430 | | | | |
| 4 | Lens 2 | −1.174 | ASP | 0.734 | Plastic | 1.607 | 26.6 | −2.57 |
| 5 | | −5.858 | ASP | 0.320 | | | | |
| 6 | Lens 3 | 0.834 | ASP | 0.524 | Plastic | 1.544 | 55.9 | 4.59 |
| 7 | | 0.975 | ASP | 0.500 | | | | |
| 8 | IR-filter | Plano | | 0.300 | Glass | 1.517 | 64.2 | — |
| 9 | | Plano | | 0.455 | | | | |
| 10 | Image | Plano | | — | | | | |

\* Reference wavelength is d-line 587.6 nm

TABLE 10

Aspheric Coefficients

| | Surface # | | | | | |
|---|---|---|---|---|---|---|
| | 1 | 2 | 4 | 5 | 6 | 7 |
| k = | −1.6412E+00 | 3.6135E+00 | −8.0429E−01 | 1.5144E+01 | −3.3236E+00 | −1.7129E+00 |
| A4 = | −1.9489E−01 | −1.6664E−01 | −5.1937E−02 | −3.9382E−01 | −2.1523E−01 | −3.1534E−01 |
| A6 = | 7.8253E−01 | −6.7346E−01 | 5.6069E−01 | 1.1392E+00 | 1.8397E−01 | 2.0775E−01 |
| A8 = | −6.6972E+00 | 3.0892E+00 | −1.1462E+00 | −1.0642E+00 | −7.4942E−02 | −7.7168E−02 |
| A10 = | 1.7270E+01 | −8.8087E+00 | 3.6535E+00 | 6.1384E−01 | 1.1120E−02 | 1.3616E−02 |
| A12 = | −1.9055E+01 | 8.9644E+00 | −1.1143E+01 | −3.7815E−01 | 9.0852E−04 | −8.1778E−04 |
| A14 = | | | 1.5263E+01 | 2.3648E−01 | −3.4382E−04 | −6.4318E−05 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

| f [mm] | 2.74 |
|---|---|
| Fno | 2.50 |
| HFOV[deg.] | 31.9 |
| V2 | 26.6 |
| CT1/CT2 | 0.71 |
| CT3/CT2 | 0.71 |
| CT1 + CT2 + CT3 [mm] | 1.78 |
| T12/T23 | 1.09 |
| R3/R4 | 0.20 |
| R6/f | 0.36 |
| f/f1 | 1.38 |
| f1/f3 | 0.43 |
| f/EPD | 2.74 |
| TTL/ImgH | 2.06 |

Embodiment 5

Figure 5A:
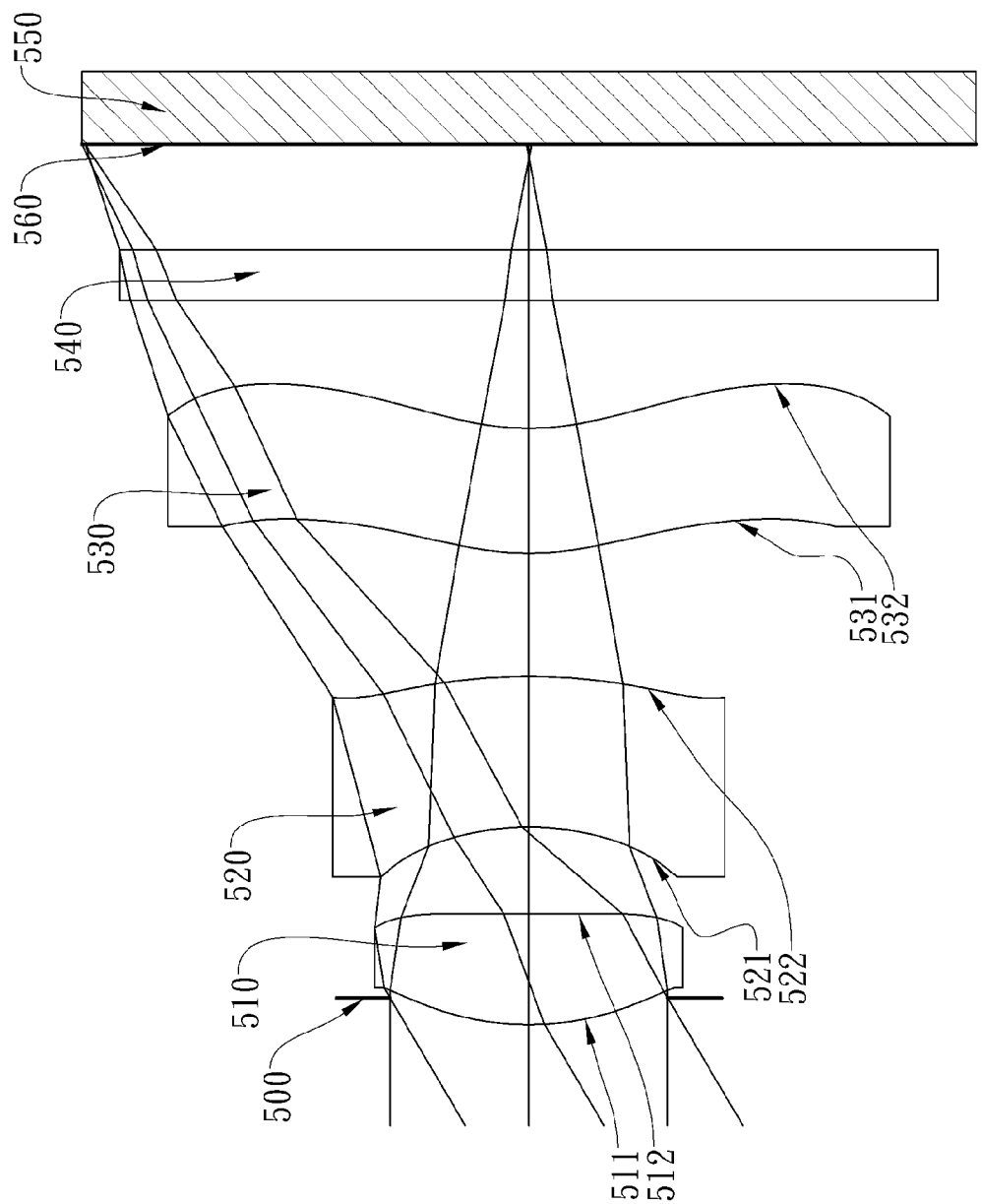
FIG. 5A shows a capturing lens system in accordance with a fifth embodiment of the present disclosure.
Figure 5B:
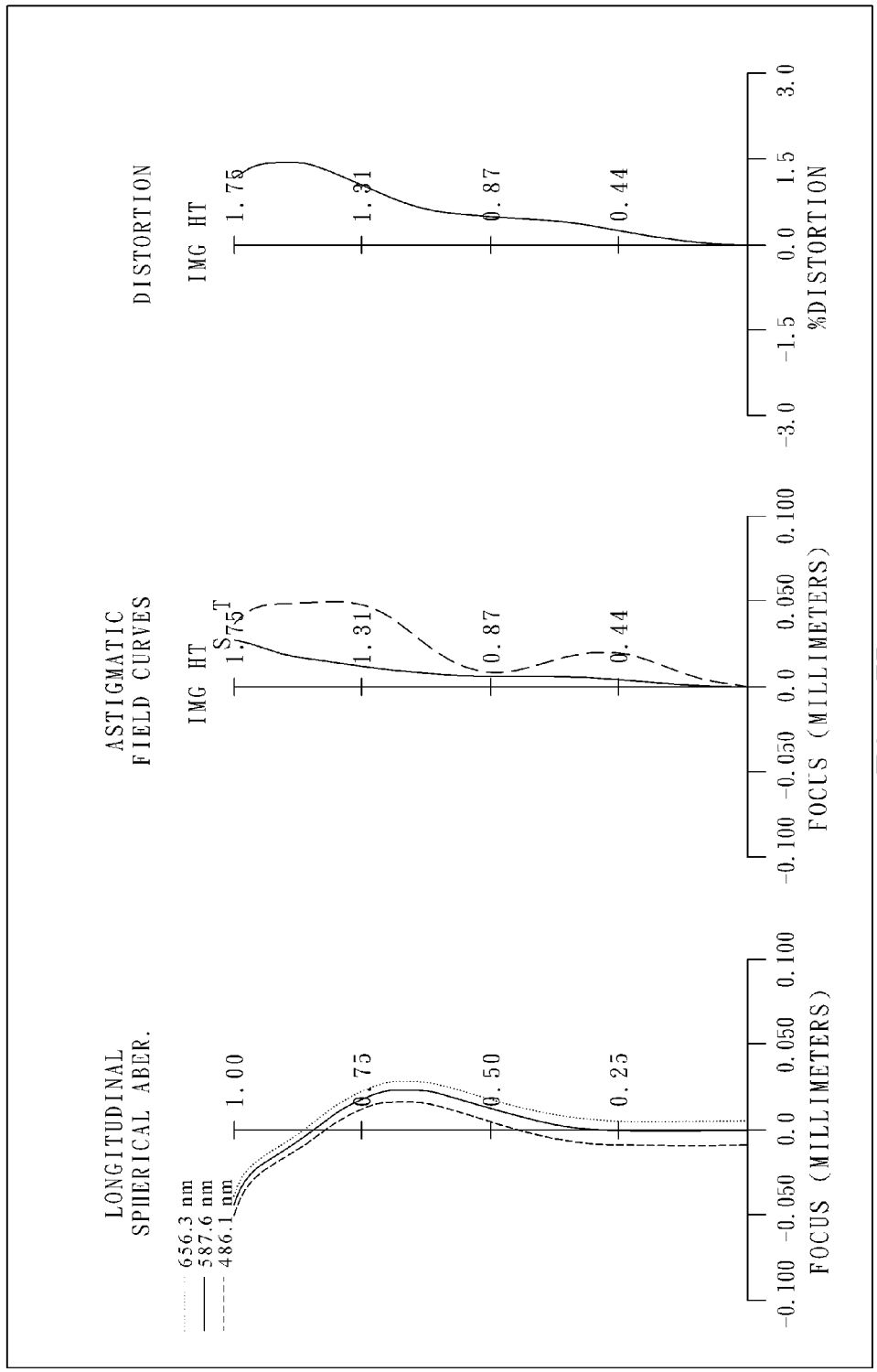
FIG. 5B shows the aberration curves of the fifth embodiment of the present disclosure.

FIG. 5A shows a capturing lens system in accordance with the fifth embodiment of the present disclosure, and FIG. 5B shows the aberration curves of the fifth embodiment of the present disclosure. The capturing lens system of the fifth embodiment of the present disclosure comprises three lens elements, in order from an object side to an image side:

a first lens element 510 made of glass with positive refractive power having a convex object-side surface 511 and a concave image-side surface 512, the object-side and image-side surfaces 511 and 512 thereof being aspheric;

a second lens element 520 made of plastic with negative refractive power having a concave object-side surface 521 and a convex image-side surface 522, the object-side and image-side surfaces 521 and 522 thereof being aspheric; and a third lens element 530 made of plastic with positive refractive power having a convex object-side surface 531 and a concave image-side surface 532, the object-side and image-side surfaces 531 and 532 thereof being aspheric, and at least one inflection point is formed on both the object-side surface 531 and the image-side surface 532 thereof;

wherein there are three lens elements with refractive power in the capturing lens system, which are the first lens element 510, the second lens element 520 and the third lens element 530 respectively; and the second lens element 520 has the greatest central thickness among the three lens elements 510, 520 and 530;

wherein an aperture stop 500 is disposed between an imaged object and the first lens element 510;

the capturing lens system further comprises an IR filter 540 disposed between the image-side surface 532 of the third lens element 530 and an image plane 560, and the IR filter 540 is made of glass and has no influence on the focal length of the capturing lens system; the capturing lens system further comprises an image sensor 550 provided on the image plane 560.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 5)
f = 2.93 mm, Fno = 2.70, HFOV = 30.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.105 | | | | |
| 2 | Lens 1 | 1.092 | ASP | 0.433 | Glass | 1.566 | 61.1 | 2.06 |
| 3 | | 14.454 | ASP | 0.340 | | | | |
| 4 | Lens 2 | −1.172 | ASP | 0.591 | Plastic | 1.634 | 23.8 | −4.06 |
| 5 | | −2.570 | ASP | 0.483 | | | | |
| 6 | Lens 3 | 1.083 | ASP | 0.489 | Plastic | 1.544 | 55.9 | 22.60 |
| 7 | | 0.999 | ASP | 0.500 | | | | |
| 8 | IR-filter | Plano | | 0.200 | Glass | 1.517 | 64.2 | |
| 9 | | Plano | | 0.412 | | | | |
| 10 | Image | Plano | | — | | | | |

* Reference wavelength is d-line 587.6 nm

TABLE 13

Aspheric Coefficients

| | Surface # | | | | | |
|---|---|---|---|---|---|---|
| | 2 | 3 | 4 | 5 | 6 | 7 |
| k = | −1.3579E+00 | −4.8415E+00 | −8.3277E−01 | 4.0593E+00 | −4.7380E+00 | −4.2132E+00 |
| A4 = | 1.2250E−01 | −1.9973E−01 | −3.8912E−01 | −2.5022E−01 | −3.5614E−01 | −2.7876E−01 |
| A6 = | −1.9158E−01 | −1.2521E−01 | 4.0893E−01 | 9.4650E−01 | 2.8194E−01 | 1.9792E−01 |
| A8 = | −4.7555E−01 | −1.7803E+00 | 1.6316E+00 | −3.5211E−01 | −9.3091E−02 | −8.9753E−02 |
| A10 = | 4.4810E+00 | −2.0968E−01 | −1.6319E+00 | −1.2611E+00 | −1.2499E−02 | 1.7685E−02 |
| A12 = | −1.4445E+01 | −5.3550E−01 | 4.0529E+00 | 2.3783E+00 | 9.8036E−03 | −4.7180E−04 |
| A14 = | | | 4.5102E+01 | −9.7840E−01 | −2.6804E−04 | −4.5338E−04 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

(Embodiment 5)

| | |
|---|---|
| f [mm] | 2.93 |
| Fno | 2.70 |
| HFOV[deg.] | 30.5 |
| V2 | 23.8 |
| CT1/CT2 | 0.73 |
| CT3/CT2 | 0.83 |
| CT1 + CT2 + CT3 [mm] | 1.51 |
| T12/T23 | 0.70 |
| R3/R4 | 0.46 |
| R6/f | 0.34 |
| f/f1 | 1.42 |
| f1/f3 | 0.09 |
| f/EPD | 2.93 |
| TTL/ImgH | 1.93 |

Embodiment 6

Figure 6A:
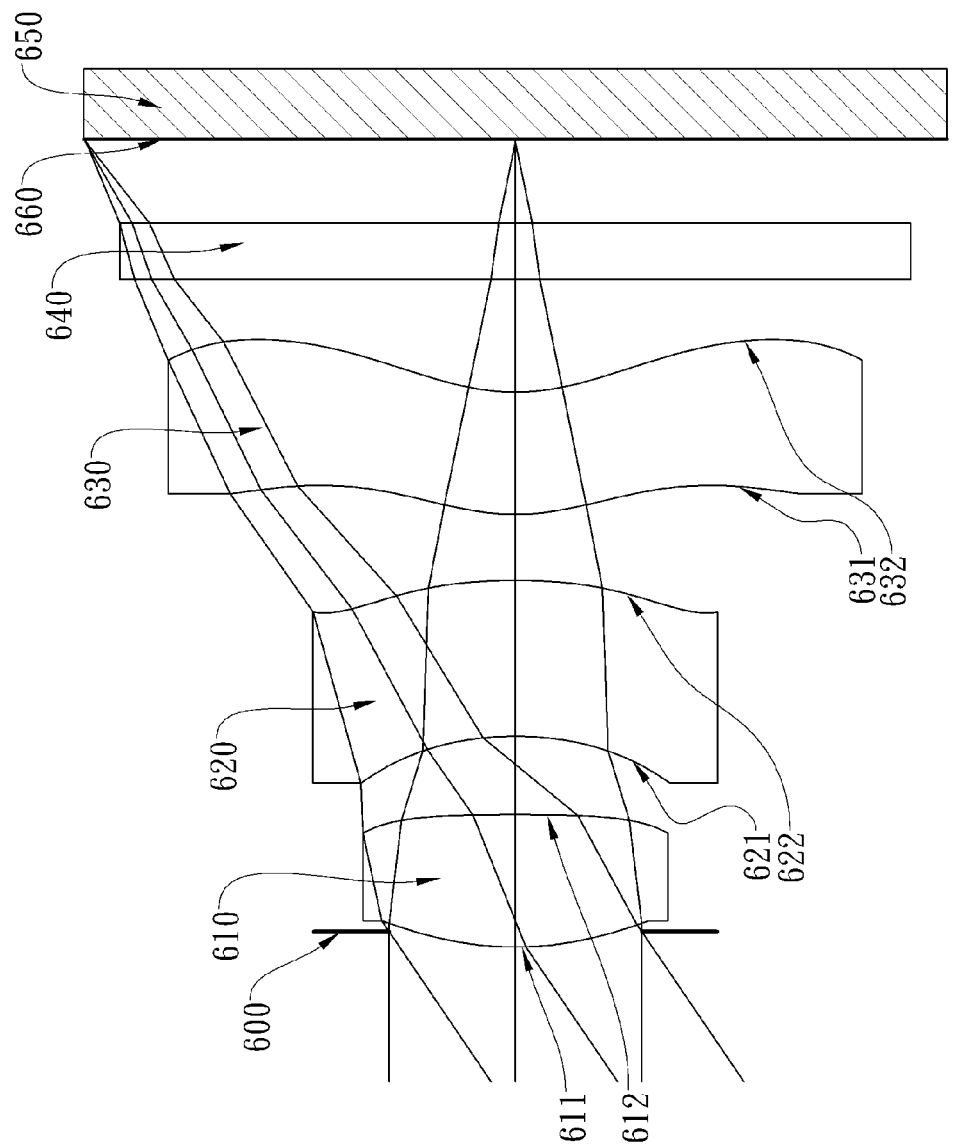
FIG. 6A shows a capturing lens system in accordance with a sixth embodiment of the present disclosure.
Figure 6B:
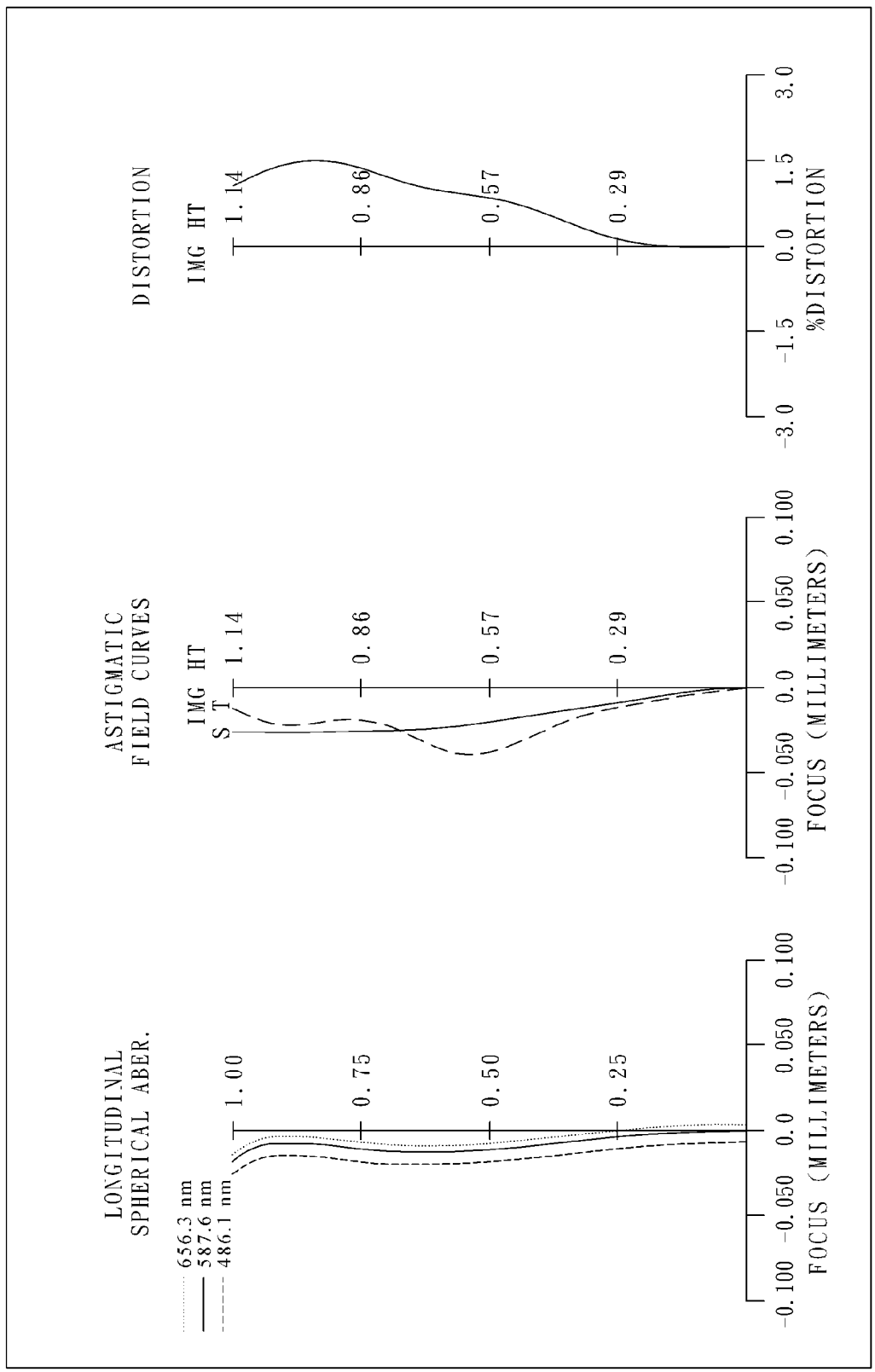
FIG. 6B shows the aberration curves of the sixth embodiment of the present disclosure.

FIG. 6A shows a capturing lens system in accordance with the sixth embodiment of the present disclosure, and FIG. 6B shows the aberration curves of the sixth embodiment of the present disclosure. The capturing lens system of the sixth embodiment of the present disclosure comprises three lens elements, in order from an object side to an image side:

a first lens element 610 made of glass with positive refractive power having a convex object-side surface 611 and a convex image-side surface 612, the object-side and image-side surfaces 611 and 612 thereof being aspheric;

a second lens element 620 made of plastic with negative refractive power having a concave object-side surface 621 and a convex image-side surface 622, the object-side and image-side surfaces 621 and 622 thereof being aspheric; and a third lens element 630 made of plastic with positive refractive power having a convex object-side surface 631 and a concave image-side surface 632, the object-side and image-side surfaces 631 and 632 thereof being aspheric, and at least one inflection point is formed on both the object-side surface 631 and the image-side surface 632 thereof;

wherein there are three lens elements with refractive power in the capturing lens system, which are the first lens element 610, the second lens element 620 and the third lens element 630 respectively; and the second lens element 620 has the greatest central thickness among the three lens elements 610, 620 and 630;

wherein an aperture stop 600 is disposed between an imaged object and the first lens element 610;

the capturing lens system further comprises an IR filter 640 disposed between the image-side surface 632 of the third lens element 630 and an image plane 660, and the IR filter 640 is made of glass and has no influence on the focal length of the capturing lens system; the capturing lens system further comprises an image sensor 650 provided on the image plane 660.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

TABLE 15

(Embodiment 6)
f = 1.68 mm, Fno = 2.50, HFOV = 34.2 deg

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.041 | | | | |
| 2 | Lens 1 | 0.856 | ASP | 0.352 | Glass | 1.566 | 61.1 | 1.40 |
| 3 | | −8.753 | ASP | 0.209 | | | | |
| 4 | Lens 2 | −0.831 | ASP | 0.415 | Plastic | 1.640 | 23.3 | −3.47 |
| 5 | | −1.589 | ASP | 0.176 | | | | |
| 6 | Lens 3 | 0.606 | ASP | 0.325 | Plastic | 1.544 | 55.9 | 9.02 |
| 7 | | 0.561 | ASP | 0.300 | | | | |
| 8 | IR-filter | Plano | | 0.150 | Glass | 1.517 | 64.2 | — |
| 9 | | Plano | | 0.223 | | | | |
| 10 | Image | Plano | | — | | | | |

* Reference wavelength is d-line 587.6 nm

TABLE 16

Aspheric Coefficients

| | Surface # | | | | | |
|---|---|---|---|---|---|---|
| | 2 | 3 | 4 | 5 | 6 | 7 |
| k = | −1.5208E+00 | −1.0000E+00 | −1.5466E+00 | −3.8894E−01 | −2.8171E+00 | −2.4992E+00 |
| A4 = | 1.8473E−02 | −8.3900E−01 | −2.8422E−01 | −1.7578E+00 | −2.4503E+00 | −1.5239E+00 |
| A6 = | 1.4489E−01 | −2.7848E+00 | −1.9506E+01 | 1.0236E+01 | 5.7758E+00 | 2.9926E+00 |
| A8 = | −6.6740E+00 | 1.5754E+01 | 2.4488E+02 | −2.8638E+01 | −8.0951E+00 | −3.6138E+00 |
| A10 = | −5.9077E+01 | −2.5928E+02 | −1.4351E+03 | 8.1284E+01 | 6.5404E+00 | 1.8648E+00 |
| A12 = | 1.4674E+02 | 7.9356E+02 | 3.1828E+03 | −1.2117E+02 | −2.2106E+00 | 4.7511E−01 |
| A14 = | | | | 8.3200E+01 | | −1.0586E+00 |
| A16 = | | | | | | 3.7098E−01 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

(Embodiment 6)

| | |
|---|---|
| f [mm] | 1.68 |
| Fno | 2.50 |
| HFOV[deg.] | 34.2 |
| V2 | 23.3 |
| CT1/CT2 | 0.85 |
| CT3/CT2 | 0.78 |
| CT1 + CT2 + CT3 [mm] | 1.09 |
| T12/T23 | 1.19 |
| R3/R4 | 0.52 |
| R6/f | 0.33 |
| f/f1 | 1.20 |
| f1/f3 | 0.15 |
| f/EPD | 1.68 |
| TTL/ImgH | 1.83 |

Embodiment 7

Figure 7A:
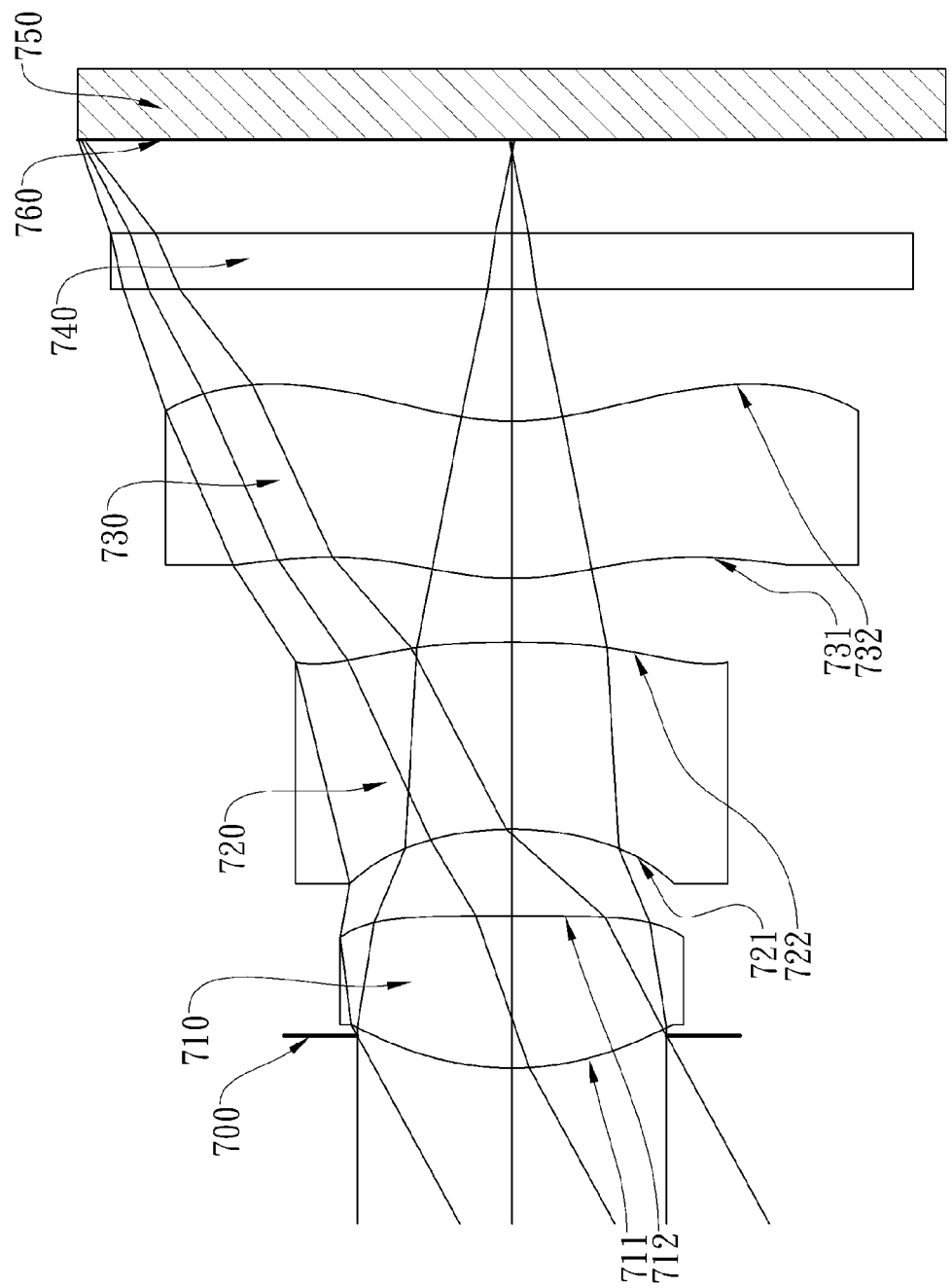
FIG. 7A shows a capturing lens system in accordance with a seventh embodiment of the present disclosure.
Figure 7B:
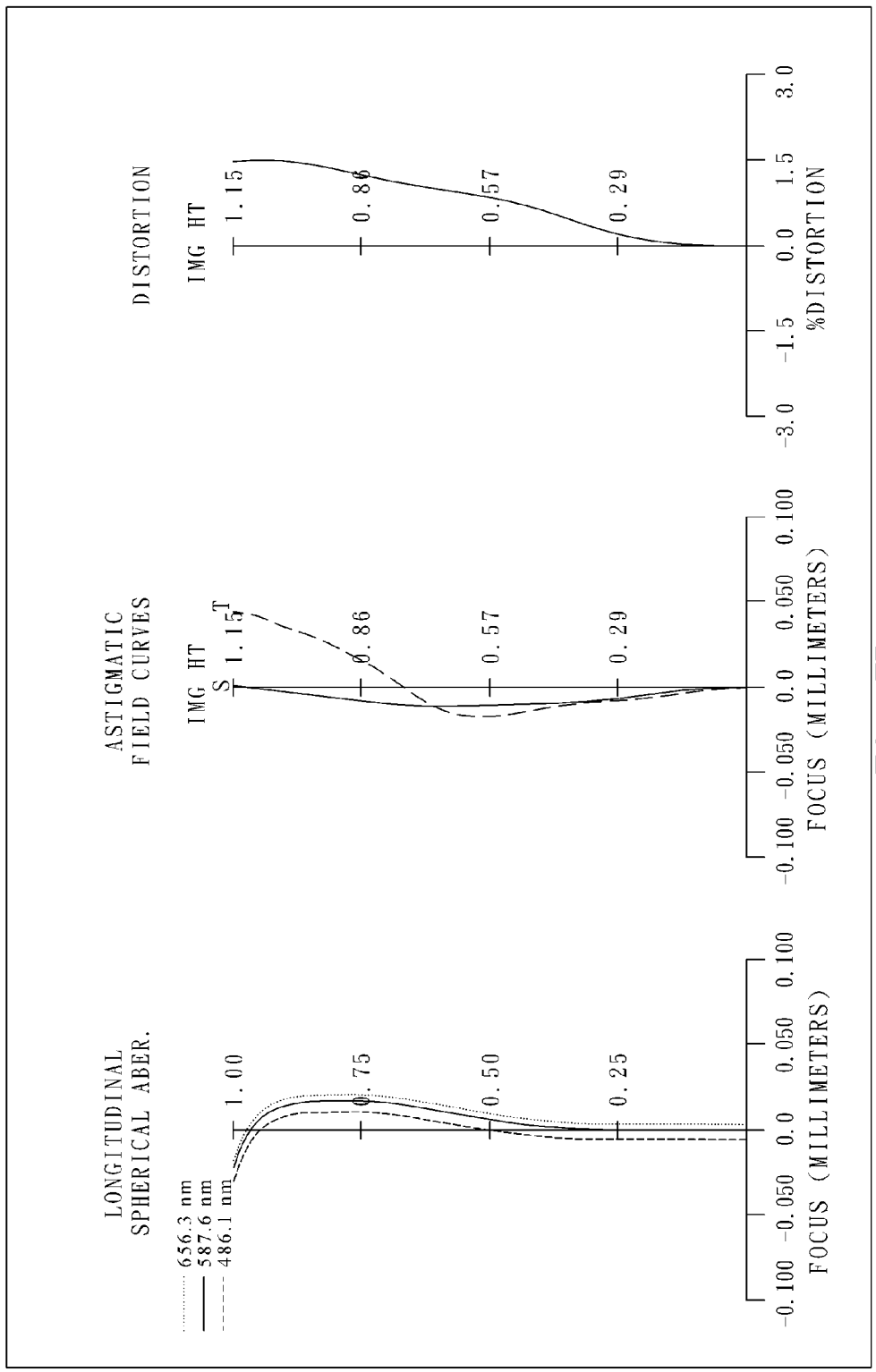
FIG. 7B shows the aberration curves of the seventh embodiment of the present disclosure.

FIG. 7A shows a capturing lens system in accordance with the seventh embodiment of the present disclosure, and FIG. 7B shows the aberration curves of the seventh embodiment of the present disclosure. The capturing lens system of the seventh embodiment of the present disclosure comprises three lens elements, in order from an object side to an image side:

a first lens element 710 made of plastic with positive refractive power having a convex object-side surface 711 and a convex image-side surface 712, the object-side and image-side surfaces 711 and 712 thereof being aspheric;

a second lens element 720 made of plastic with negative refractive power having a concave object-side surface 721 and a convex image-side surface 722, the object-side and image-side surfaces 721 and 722 thereof being aspheric; and a third lens element 730 made of plastic with positive refractive power having a convex object-side surface 731 and a concave image-side surface 732, the object-side and image-side surfaces 731 and 732 thereof being aspheric, and at least one inflection point is formed on both the object-side surface 731 and the image-side surface 732 thereof;

wherein there are three lens elements with refractive power in the capturing lens system, which are the first lens element 710, the second lens element 720 and the third lens element 730 respectively; and the second lens element 720 has the greatest central thickness among the three lens elements 710, 720 and 730;

wherein an aperture stop 700 is disposed between an imaged object and the first lens element 710;

the capturing lens system further comprises an IR filter 740 disposed between the image-side surface 732 of the third lens element 730 and an image plane 760, and the IR filter 740 is made of glass and has no influence on the focal length of the capturing lens system; the capturing lens system further comprises an image sensor 750 provided on the image plane 760.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)
f = 2.06 mm, Fno = 2.50, HFOV = 28.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.086 | | | | |
| 2 | Lens 1 | 0.786 | ASP | 0.405 | Plastic | 1.544 | 55.9 | 1.42 |
| 3 | | −33.495 | ASP | 0.231 | | | | |
| 4 | Lens 2 | −0.876 | ASP | 0.498 | Plastic | 1.640 | 23.3 | −2.00 |
| 5 | | −3.393 | ASP | 0.170 | | | | |
| 6 | Lens 3 | 0.745 | ASP | 0.419 | Plastic | 1.544 | 55.9 | 6.37 |
| 7 | | 0.760 | ASP | 0.350 | | | | |
| 8 | IR-filter | Plano | | 0.150 | Glass | 1.517 | 64.2 | — |
| 9 | | Plano | | 0.248 | | | | |
| 10 | Image | Plano | | — | | | | |

* Reference wavelength is d-line 587.6 nm

TABLE 19

Aspheric Coefficients

| | Surface # | | | | | |
|---|---|---|---|---|---|---|
| | 2 | 3 | 4 | 5 | 6 | 7 |
| k = | −1.1310E+00 | −9.0000E+01 | −1.4852E+00 | 5.3895E−01 | −3.3224E+00 | −1.5308E+00 |
| A4 = | 1.1183E−01 | −4.9794E−01 | −3.0065E−01 | −1.7663E+00 | −2.3157E+00 | −1.6323E+00 |
| A6 = | 3.7176E−01 | −2.9598E+00 | −1.9061E+01 | 9.9039E+00 | 5.6956E+00 | 2.8719E+00 |
| A8 = | −2.4639E+00 | 2.3642E+01 | 2.6307E+02 | −2.8590E+01 | −8.1336E+00 | −3.3637E+00 |
| A10 = | 1.0791E+01 | −2.2736E+02 | −1.6686E+03 | 7.5109E+01 | 6.5980E+00 | 1.7801E+00 |
| A12 = | −1.5386E+02 | 4.9585E+02 | 3.5802E+03 | −1.2854E+02 | −2.2543E+00 | 4.5016E−01 |
| A14 = | | | | 1.0341E+02 | | −1.0778E+00 |
| A16 = | | | | | | 3.8643E−01 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| f [mm] | 2.06 |
|---|---|
| Fno | 2.50 |
| HFOV[deg.] | 28.6 |
| V2 | 23.3 |
| CT1/CT2 | 0.81 |
| CT3/CT2 | 0.84 |
| CT1 + CT2 + CT3 [mm] | 1.32 |
| T12/T23 | 1.36 |
| R3/R4 | 0.26 |
| R6/f | 0.37 |
| f/f1 | 1.45 |
| f1/f3 | 0.22 |
| f/EPD | 2.06 |
| TTL/ImgH | 2.11 |

Embodiment 8

Figure 8A:
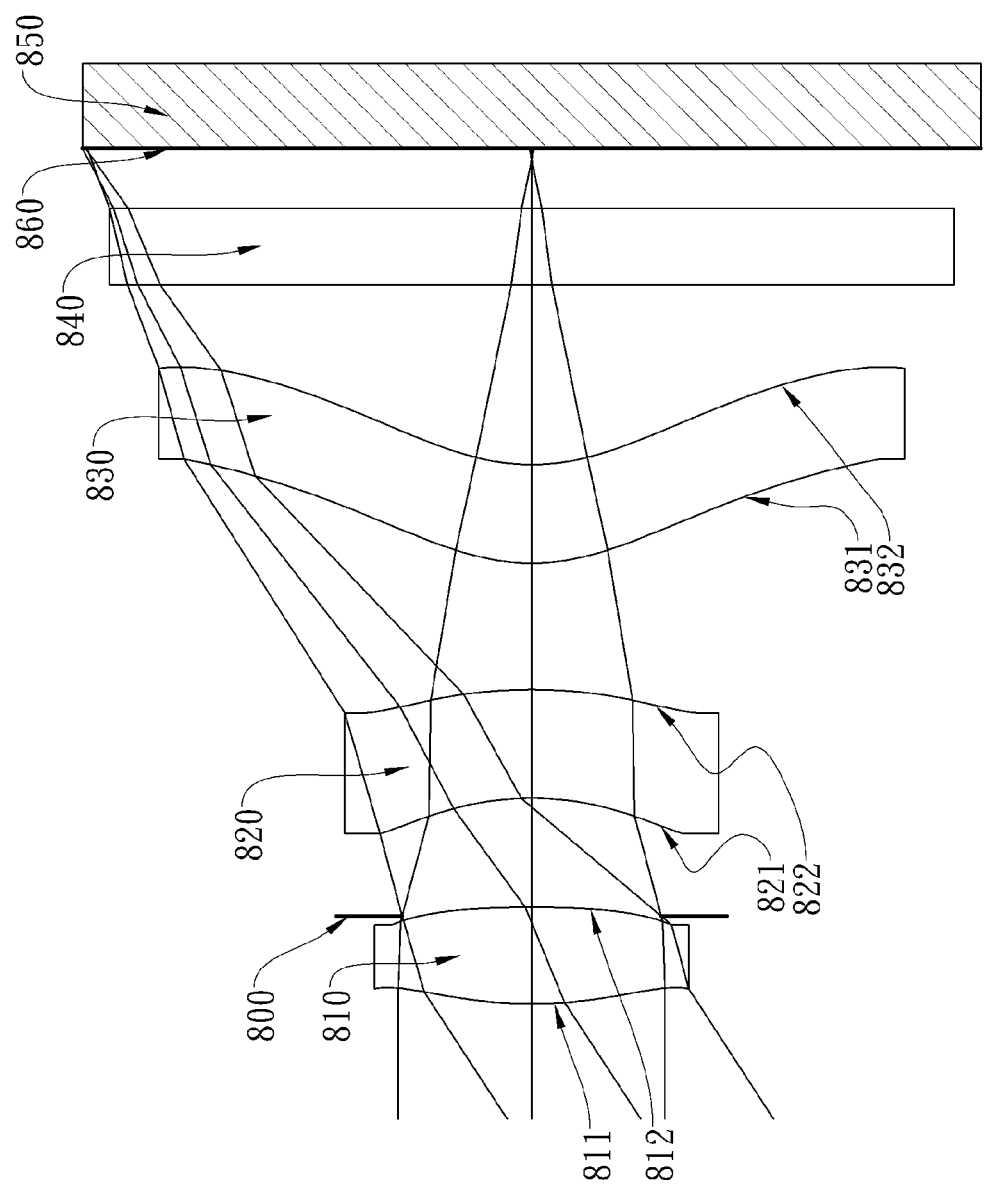
FIG. 8A shows a capturing lens system in accordance with an eighth embodiment of the present disclosure.
Figure 8B:
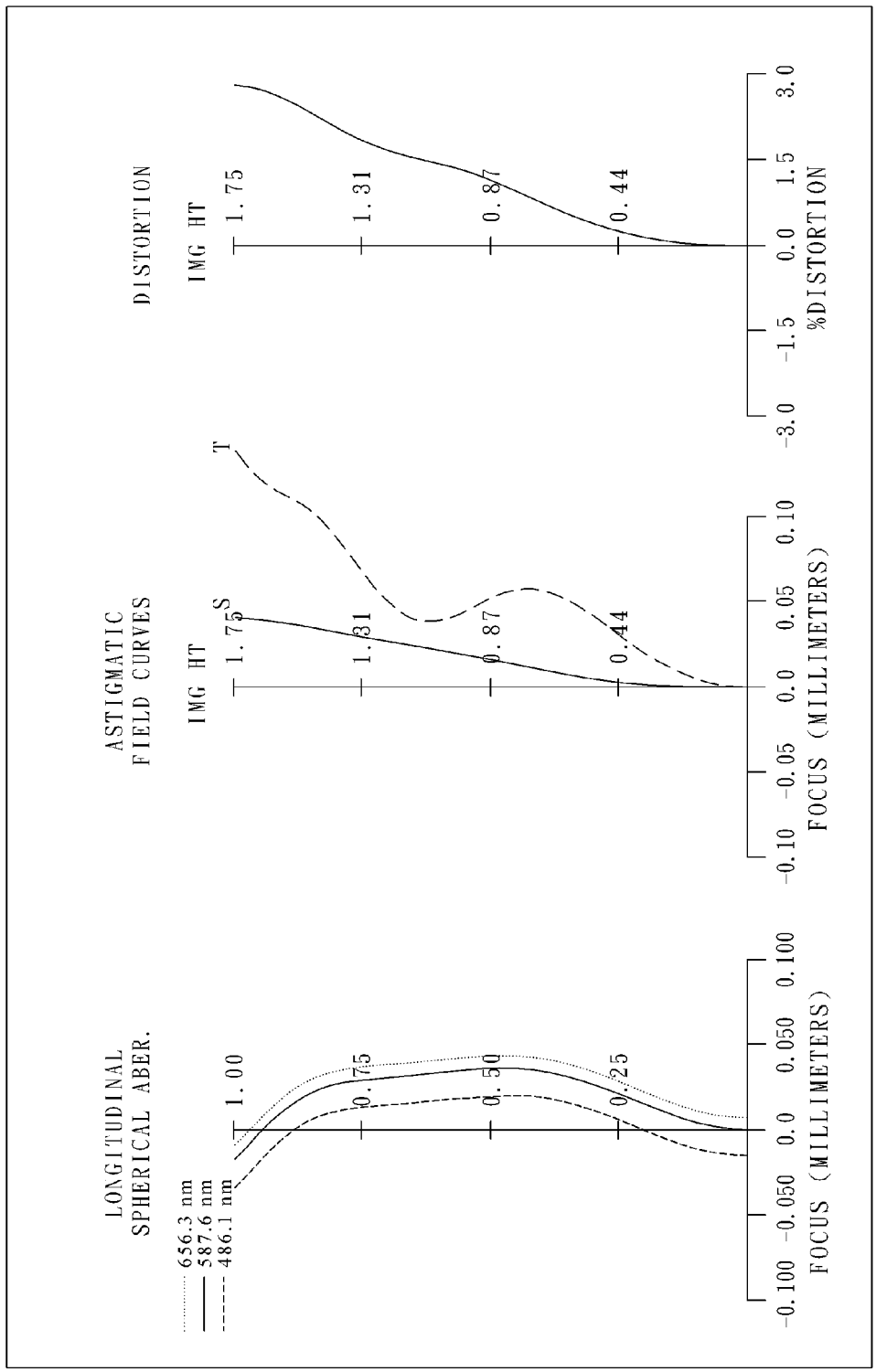
FIG. 8B shows the aberration curves of the eighth embodiment of the present disclosure.

FIG. 8A shows a capturing lens system in accordance with the eighth embodiment of the present disclosure, and FIG. 8B shows the aberration curves of the eighth embodiment of the present disclosure. The capturing lens system of the eighth embodiment of the present disclosure comprises three lens elements, in order from an object side to an image side:

a first lens element 810 made of plastic with positive refractive power having a convex object-side surface 811 and a convex image-side surface 812, the object-side and image-side surfaces 811 and 812 thereof being aspheric;

a second lens element 820 made of plastic with negative refractive power having a concave object-side surface 821 and a convex image-side surface 822, the object-side and image-side surfaces 821 and 822 thereof being aspheric; and a third lens element 830 made of plastic with positive refractive power having a convex object-side surface 831 and a concave image-side surface 832, the object-side and image-side surfaces 831 and 832 thereof being aspheric, and at least one inflection point is formed on both the object-side surface 831 and the image-side surface 832 thereof;

wherein there are three lens elements with refractive power in the capturing lens system, which are the first lens element 810, the second lens element 820 and the third lens element 830 respectively; and the second lens element 820 has the greatest central thickness among the three lens elements 810, 820 and 830;

wherein an aperture stop 800 is disposed between the first lens element 810 and the second lens element 820;

the capturing lens system further comprises an IR filter 840 disposed between the image-side surface 832 of the third lens element 830 and an image plane 860, and the IR filter 840 is made of glass and has no influence on the focal length of the capturing lens system; the capturing lens system further comprises an image sensor 850 provided on the image plane 860.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

TABLE 21

(Embodiment 8)
f = 2.59 mm, Fno = 2.50, HFOV = 32.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.642 | ASP | 0.376 | Plastic | 1.544 | 55.9 | 2.29 |
| 2 | | −4.740 | ASP | −0.034 | | | | |
| 3 | Ape. Stop | Plano | | 0.460 | | | | |
| 4 | Lens 2 | −1.175 | ASP | 0.423 | Plastic | 1.634 | 23.8 | −5.14 |
| 5 | | −2.095 | ASP | 0.493 | | | | |
| 6 | Lens 3 | 0.781 | ASP | 0.385 | Plastic | 1.544 | 55.9 | 7.29 |
| 7 | | 0.803 | ASP | 0.700 | | | | |
| 8 | IR-filter | Plano | | 0.300 | Glass | 1.517 | 64.2 | — |
| 9 | | Plano | | 0.267 | | | | |
| 10 | Image | Plano | | — | | | | |

* Reference wavelength is d-line 587.6 nm

TABLE 22

Aspheric Coefficients

| | Surface # | | | | | |
|---|---|---|---|---|---|---|
| | 1 | 2 | 4 | 5 | 6 | 7 |
| k = | −8.0543E−01 | 1.5547E+01 | 1.9590E−02 | −9.3933E−01 | −2.3910E+00 | −1.8965E+00 |
| A4 = | −2.1658E−01 | −2.7625E−01 | −2.2458E−01 | −3.4954E−01 | −2.6365E−01 | −3.0510E−01 |
| A6 = | 6.0579E−01 | −5.9411E−01 | 1.5482E+00 | 1.2794E+00 | 1.8296E−01 | 1.9734E−01 |
| A8 = | −6.0868E+00 | 2.1989E+00 | −1.7047E+00 | −9.9347E−01 | −6.9434E−02 | −7.6169E−02 |
| A10 = | 1.5561E+01 | −8.0073E+00 | 3.3890E+00 | 6.6786E−01 | 1.1689E−02 | 1.4147E−02 |
| A12 = | −1.9055E+01 | 8.9644E+00 | −1.1143E+01 | −1.9410E−01 | 1.7964E−04 | −7.3411E−04 |
| A14 = | | | 1.5263E+01 | −1.2358E−01 | −2.3055E−04 | −9.3955E−05 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| f [mm] | 2.59 |
|---|---|
| Fno | 2.50 |
| HFOV[deg.] | 32.8 |
| V2 | 23.8 |
| CT1/CT2 | 0.89 |
| CT3/CT2 | 0.91 |
| CT1 + CT2 + CT3 [mm] | 1.18 |
| T12/T23 | 0.86 |
| R3/R4 | 0.56 |
| R6/f | 0.31 |
| f/f1 | 1.13 |
| f1/f3 | 0.31 |
| f/EPD | 2.59 |
| TTL/ImgH | 1.87 |

It is to be noted that TABLES 1-23 show different data of the different embodiments, however, the data of the different embodiments are obtained from experiments. Therefore, any capturing lens system of the same structure is considered to be within the scope of the present disclosure even if it uses different data. The embodiments depicted above and the appended drawings are exemplary and are not intended to limit the scope of the present disclosure.

What is claimed is:

1. A capturing lens system comprising, in order from an object side to an image side:
a first lens element with positive refractive power;
a plastic second lens element with negative refractive power having a concave object-side surface and a convex image-side surface, both the object-side and image-side surfaces thereof being aspheric; and
a plastic third lens element with positive refractive power having a convex object-side surface and a concave image-side surface, both the object-side and image-side surfaces thereof being aspheric, and at least one inflection point is formed on at least one of the object-side and image-side surfaces thereof;
wherein there are three lens elements with refractive power in the capturing lens system, which are the first lens element, the second lens element and the third lens element; and the second lens element has the greatest central thickness among the three lens elements; a central thickness of the first lens element is CT1, a central thickness of the second lens element is CT2, a central thickness of the third lens element is CT3, an axial distance between the first lens element and the second lens element is T12, an axial distance between the second lens element and the third lens element is T23, and they satisfy the following relations:

$0.2 < CT1/CT2 < 1.0;$ $0.2 < CT3/CT2 < 1.0;$ and $0.3 < T12/T23 < 1.8.$

2. The capturing lens system according to claim 1, wherein the first lens element has a convex object-side surface, a radius of the curvature of the object-side surface of the second lens element is R3, a radius of the curvature of the image-side surface of the second lens element is R4, and they satisfy the following relation:

0<R3/R4<0.9.

3. The capturing lens system according to claim 2, wherein a focal length of the first lens element is f1, a focal length of the third lens element is f3, and they satisfy the following relation:

0<f1/f3<0.5.

4. The capturing lens system according to claim 3, wherein an Abbe number of the second lens element is V2, and it satisfies the following relation:

10<V2<27.

5. The capturing lens system according to claim 3, wherein a focal length of the capturing lens system is f, the focal length of the first lens element is f1, and they satisfy the following relation:

1.25<f/f1<1.50.

6. The capturing lens system according to claim 3, wherein the axial distance between the first lens element and the second lens element is T12, the axial distance between the second lens element and the third lens element is T23, and they satisfy the following relation:

0.5<T12/T23<1.5.

7. The capturing lens system according to claim 1, wherein a radius of the curvature of the image-side surface of the third lens element is R6, a focal length of the capturing lens system is f, and they satisfy the following relation:

0<R6/f<0.80.

8. The capturing lens system according to claim 7, wherein the radius of the curvature of the image-side surface of the third lens element is R6, the focal length of the capturing lens system is f, and they satisfy the following relation:

0<R6/f<0.38.

9. The capturing lens system according to claim 7, wherein the central thickness of the third lens element is CT3, the central thickness of the second lens element is CT2, and they satisfy the following relation:

0.4<CT3/CT2<0.93.

10. The capturing lens system according to claim 1, wherein the central thickness of the first lens element is CT1, the central thickness of the second lens element is CT2, the central thickness of the third lens element is CT3, and they satisfy the following relation:

0.60 mm<CT1+CT2+CT3<1.56 mm.

11. The capturing lens system according to claim 1, wherein a focal length of the capturing lens system is f, an entrance pupil diameter of the capturing lens system is EPD, and they satisfy the following relation:

1.95<f/EPD<2.75.

12. The capturing lens system according to claim 1, further comprising an image sensor on an image plane; an axial distance between the object-side surface of the first lens element and the image plane is TTL, a maximum image height of the capturing lens system is ImgH, and they satisfy the following relation:

TTL/ImgH<2.15.

13. A capturing lens system comprising, in order from an object side to an image side:
   a first lens element with positive refractive power;
   a plastic second lens element with negative refractive power having a concave object-side surface and a convex image-side surface, both the object-side and image-side surfaces thereof being aspheric; and
   a plastic third lens element with positive refractive power having a convex object-side surface and a concave image-side surface, both the object-side and image-side surfaces thereof being aspheric, and at least one inflection point is formed on at least one of the object-side and image-side surfaces thereof;
   wherein there are three lens elements with refractive power in the capturing lens system, which are the first lens element, the second lens element and the third lens element; and the second lens element has the greatest central thickness among the three lens elements; a central thickness of the first lens element is CT1, a central thickness of the second lens element is CT2, a central thickness of the third lens element is CT3, an axial distance between the first lens element and the second lens element is T12, an axial distance between the second lens element and the third lens element is T23, an Abbe number of the second lens element is V2, and they satisfy the following relations:

0.2<CT1/CT2<1.0;

0.2<CT3/CT2<1.0;

0.2<T12/T23<1.8; and

10<V2<27.

14. The capturing lens system according to claim 13, wherein the first lens element has a convex object-side surface, a radius of the curvature of the object-side surface of the second lens element is R3, a radius of the curvature of the image-side surface of the second lens element is R4, and they satisfy the following relation:

0<R3/R4<0.9.

15. The capturing lens system according to claim 14, wherein a radius of the curvature of the image-side surface of the third lens element is R6, a focal length of the capturing lens system is f, and they satisfy the following relation:

0<R6/f<0.80.

16. The capturing lens system according to claim 14, wherein a focal length of the first lens element is f1, a focal length of the third lens element is f3, and they satisfy the following relation:

0<f1/f3<0.5.

17. The capturing lens system according to claim 13, wherein the axial distance between the first lens element and the second lens element is T12, the axial distance between the second lens element and the third lens element is T23, and they satisfy the following relation:

0.5<T12/T23<1.5.

18. The capturing lens system according to claim 13, wherein a focal length of the capturing lens system is f, a focal length of the first lens element is f1, and they satisfy the following relation:

1.25<f/f1<1.50.

19. The capturing lens system according to claim 13, wherein the central thickness of the third lens element is CT3, the central thickness of the second lens element is CT2, and they satisfy the following relation:

$$0.4 < CT3/CT2 < 0.93.$$

20. The capturing lens system according to claim 13, wherein the central thickness of the first lens element is CT1, the central thickness of the second lens element is CT2, the central thickness of the third lens element is CT3, and they satisfy the following relation:

$$0.60 \text{ mm} < CT1+CT2+CT3 < 1.56 \text{ mm}.$$

* * * * *